US010063437B2

(12) United States Patent
Matsuno

(10) Patent No.: US 10,063,437 B2
(45) Date of Patent: Aug. 28, 2018

(54) NETWORK MONITORING SYSTEM AND METHOD

(71) Applicant: FUJITSU LIMITED, Kawasaki-shi, Kanagawa (JP)

(72) Inventor: Akinori Matsuno, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 295 days.

(21) Appl. No.: 14/739,517

(22) Filed: Jun. 15, 2015

(65) Prior Publication Data

US 2015/0381460 A1  Dec. 31, 2015

(30) Foreign Application Priority Data

Jun. 26, 2014 (JP) ................................. 2014-130886

(51) Int. Cl.
*H04L 12/26* (2006.01)
*H04L 12/24* (2006.01)

(52) U.S. Cl.
CPC ...... *H04L 43/0817* (2013.01); *H04L 41/0668* (2013.01); *H04L 43/0876* (2013.01)

(58) Field of Classification Search
None
See application file for complete search history.

(56) References Cited

U.S. PATENT DOCUMENTS

| | | | | |
|---|---|---|---|---|
| 2004/0049524 | A1* | 3/2004 | Toyota | B25J 9/1669 |
| 2008/0288812 | A1* | 11/2008 | Maya | H04L 67/1008 |
| | | | | 714/4.11 |
| 2011/0239215 | A1* | 9/2011 | Sugai | G06F 9/45558 |
| | | | | 718/1 |
| 2012/0198447 | A1* | 8/2012 | Osogami | G06F 9/5066 |
| | | | | 718/1 |
| 2012/0204051 | A1 | 8/2012 | Murakami et al. | |
| 2015/0381407 | A1* | 12/2015 | Wang | H04L 41/0663 |
| | | | | 370/221 |

FOREIGN PATENT DOCUMENTS

| | | |
|---|---|---|
| JP | 2011-039740 | 2/2011 |
| JP | 2011-82799 | 4/2011 |

* cited by examiner

*Primary Examiner* — Joseph A Bednash
(74) *Attorney, Agent, or Firm* — Fujitsu Patent Center

(57) ABSTRACT

A network monitoring system includes first to third information processing apparatuses. The first information processing apparatus provides a first virtual machine monitoring a monitoring target apparatus with resource for processing predetermined load received from the monitoring target apparatus. The second information processing apparatus provides a second virtual machine monitoring the monitoring target apparatus with resource less than the resource for processing the predetermined load. When an abnormality occurs in the monitoring of the monitoring target apparatus by the first virtual machine, the second information processing apparatus migrates the second virtual machine to a third information processing apparatus capable of providing the second virtual machine with resource for processing the predetermined load.

6 Claims, 22 Drawing Sheets

FIG. 9

SYSTEM TABLE 221

| SYSTEM | TYPE | EMS NUMBER | NAME | OPERATION STATUS | MIGRATION DESTINATION | SWITCHOVER OCCURRENCE TIME |
|---|---|---|---|---|---|---|
| MAIN | NMS | — | NMS SERVER N1 | ACT | — | — |
| MAIN | EMS | 1 | EMS SERVER E1 | ACT | — | 2014/04/10 10:10:10 |
| MAIN | EMS | 2 | EMS SERVER E2 | ACT | — | 2014/04/12 12:12:12 |
| MAIN | EMS | 3 | EMS SERVER E3 | ACT | — | 2013/12/01 08:00:00 |
| MAIN | EMS | 4 | EMS SERVER E4 | ACT | — | 2013/12/01 08:00:00 |
| ... | ... | ... | ... | ... | ... | ... |

FIG. 10

SYSTEM TABLE 621

| SYSTEM | TYPE | EMS NUMBER | NAME | OPERATION STATUS | MIGRATION DESTINATION | SWITCHOVER OCCURRENCE TIME |
|---|---|---|---|---|---|---|
| SUB | NMS | — | NMS SERVER N2 | STBY | — | — |
| SUB | EMS | 11 | EMS SERVER E11 | STBY | MANAGEMENT SERVER 600 | 2014/04/10 10:10:10 |
| SUB | EMS | 12 | EMS SERVER E12 | STBY | MANAGEMENT SERVER 600 | 2014/04/12 12:12:12 |
| SUB | EMS | 13 | EMS SERVER E13 | STBY | — | 2013/12/01 08:00:00 |
| SUB | EMS | 14 | EMS SERVER E14 | STBY | MONITORING SERVER 700b | 2013/12/01 08:00:00 |
| ... | ... | ... | ... | ... | ... | ... |

| NE MANAGEMENT TABLE ||||||
|---|---|---|---|---|---|
| NE NUMBER | NAME | MONITORING SERVER | IP ADDRESS | MONITORED STATUS | ABNORMAL CONDITION OCCURRENCE TIME |
| 1 | NE10a | EMS SERVER E1 | 192.168.101.101 | ABNORMAL | 2014/04/15 15:15:15 |
| | | EMS SERVER E11 | | NORMAL | — |
| ... | ... | ... | ... | ... | ... |
| 11 | NE10e | EMS SERVER E2 | 192.168.120.101 | ABNORMAL | 2014/04/15 15:15:20 |
| | | EMS SERVER E12 | | NORMAL | — |
| ... | ... | ... | ... | ... | ... |
| 21 | NE10h | EMS SERVER E3 | 192.168.150.101 | NORMAL | — |
| | | EMS SERVER E13 | | NORMAL | — |
| ... | ... | ... | ... | ... | ... |
| 31 | NE10n | EMS SERVER E4 | 192.168.202.101 | NORMAL | — |
| | | EMS SERVER E14 | | NORMAL | — |
| ... | ... | ... | ... | ... | ... |

FIG. 12

| | | | | | 622 |
|---|---|---|---|---|---|
| NE MANAGEMENT TABLE ||||||
| NE NUMBER | NAME | MONITORING SERVER | IP ADDRESS | MONITORED STATUS | ABNORMAL CONDITION OCCURRENCE TIME |
| 1 | NE10a | EMS SERVER E1 | 192.168.101.101 | ABNORMAL | 2014/04/15 15:15:15 |
| | | EMS SERVER E11 | | NORMAL | — |
| ... | ... | ... | ... | ... | ... |
| 11 | NE10e | EMS SERVER E2 | 192.168.120.101 | ABNORMAL | 2014/04/15 15:15:20 |
| | | EMS SERVER E12 | | NORMAL | — |
| ... | ... | ... | ... | ... | ... |
| 21 | NE10h | EMS SERVER E3 | 192.168.150.101 | NORMAL | — |
| | | EMS SERVER E13 | | NORMAL | — |
| ... | ... | ... | ... | ... | ... |
| 31 | NE10n | EMS SERVER E4 | 192.168.202.101 | NORMAL | — |
| | | EMS SERVER E14 | | NORMAL | — |
| ... | ... | ... | ... | ... | ... |

FIG. 13

| NOTIFICATION TABLE | | | 223 |
|---|---|---|---|
| DATE AND TIME | ALARM NAME | NE NUMBER | SEVERITY |
| 2013/12/20 09:20:30 | LOS | 1 | major |
| 2013/12/20 20:30:10 | LINK DOWN | 2 | critical |
| 2013/12/21 03:15:45 | FALSE | 2 | clear |

NETWORK MONITORING SYSTEM AND METHOD

CROSS-REFERENCE TO RELATED APPLICATION

This application is based upon and claims the benefit of priority of the prior Japanese Patent Application No. 2014-130886, filed on Jun. 26, 2014, the entire contents of which are incorporated herein by reference.

FIELD

The embodiment discussed herein relates to a network monitoring system and a network monitoring method.

BACKGROUND

In recent years, systems for monitoring networks have been used to maintain the quality of the networks. Such systems are called network monitoring systems. For example, there is a system in which a server is used to monitor an operating status of a plurality of transmission apparatuses on a network. The transmission apparatuses are apparatuses that are capable of transmitting data and voice and that are arranged in various places. Each of the transmission apparatuses is also capable of notifying the server of a network status among communication terminals via a base station. For example, each transmission apparatus transmits a notification message indicating whether a network is properly operating to the server. The server monitors the notification messages transmitted from the transmission apparatuses and provides a client with the network status. In this way, a user of the client grasps the network status.

In addition, there are network monitoring systems that employ hot-standby redundancy to increase their availability and reliability. Hot standby is a system multiplexing technique in which two systems having an identical configuration are arranged: one system (for example, an active system) is set in an active state and the other system (for example, a standby system) is set in a standby state while being caused to perform the same operation as that of the active system. Since both the active and standby systems monitor a network, even when a server in the active system malfunctions, a server in the standby system continuously monitors the network.

In addition, there has been proposed a technique for automatically migrating a system in which a violation of Service Level Agreement (SLA) could occur to an environment with availability. If a redundancy configuration is possible, a virtual machine operated on such risky system is migrated to two physical servers. If a redundancy configuration is not possible, a virtual machine operated on the risky system is migrated to a fault tolerant (FT) server. After a predetermined period of time elapses, if no risk is observed, the state that is before the redundancy configuration is created or the state that is before the virtual machine is migrated to the FT server is restored.

See, for example, Japanese Laid-open Patent Publication No. 2011-39740.

A server that belongs to a network monitoring system could be subjected to heavy load. One of such occasions is when a server receives a large number of notification messages (alarms) indicating that an abnormality has occurred from a transmission apparatus. Thus, such a server is provided with sufficient resource for processing such heavy load. Examples of the resource include resource of a processor and resource of a memory.

However, in a normal operation, namely, when the server is not under heavy load, the resource included in the server are not fully used. Therefore, in a system having a redundancy configuration, such as in a hot-standby system, a standby system may be provided with only the amount of resource that is sufficient for processing the load in a normal operation. In this way, the amount of resource used in the system is reduced.

However, if the amount of resource in the standby system is reduced, when an abnormality occurs in the monitoring performed in an active system and when the standby system is switched to serve as an active system, this system having been switched to newly serve as an active system will not withstand the heavy load. As a result, the reliability of the system is decreased.

SUMMARY

In one aspect, there is provided a network monitoring system that includes a plurality of information processing apparatuses, the network monitoring system including: a first information processing apparatus configured to provide a first virtual machine monitoring a monitoring target apparatus with first resource for processing predetermined load received from the monitoring target apparatus; and a second information processing apparatus configured to provide a second virtual machine monitoring the monitoring target apparatus with second resource less than the first resource for processing the predetermined load, wherein, when an abnormality occurs in the monitoring of the monitoring target apparatus by the first virtual machine, the second information processing apparatus migrates the second virtual machine to a third information processing apparatus configured to be capable of providing the second virtual machine with third resource for processing the predetermined load.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 illustrates an exemplary system table included in the management server that belongs to the main center;

FIG. 10 illustrates an exemplary system table included in the management server that belongs to the sub-center;

FIG. 11 illustrates an exemplary NE management table included in the management server that belongs to the main center;

FIG. 12 illustrates an exemplary NE management table included in the management server that belongs to the sub-center;

FIG. 13 illustrates an exemplary notification table included in the management server that belongs to the main center;

DESCRIPTION OF EMBODIMENTS

Figure 1:
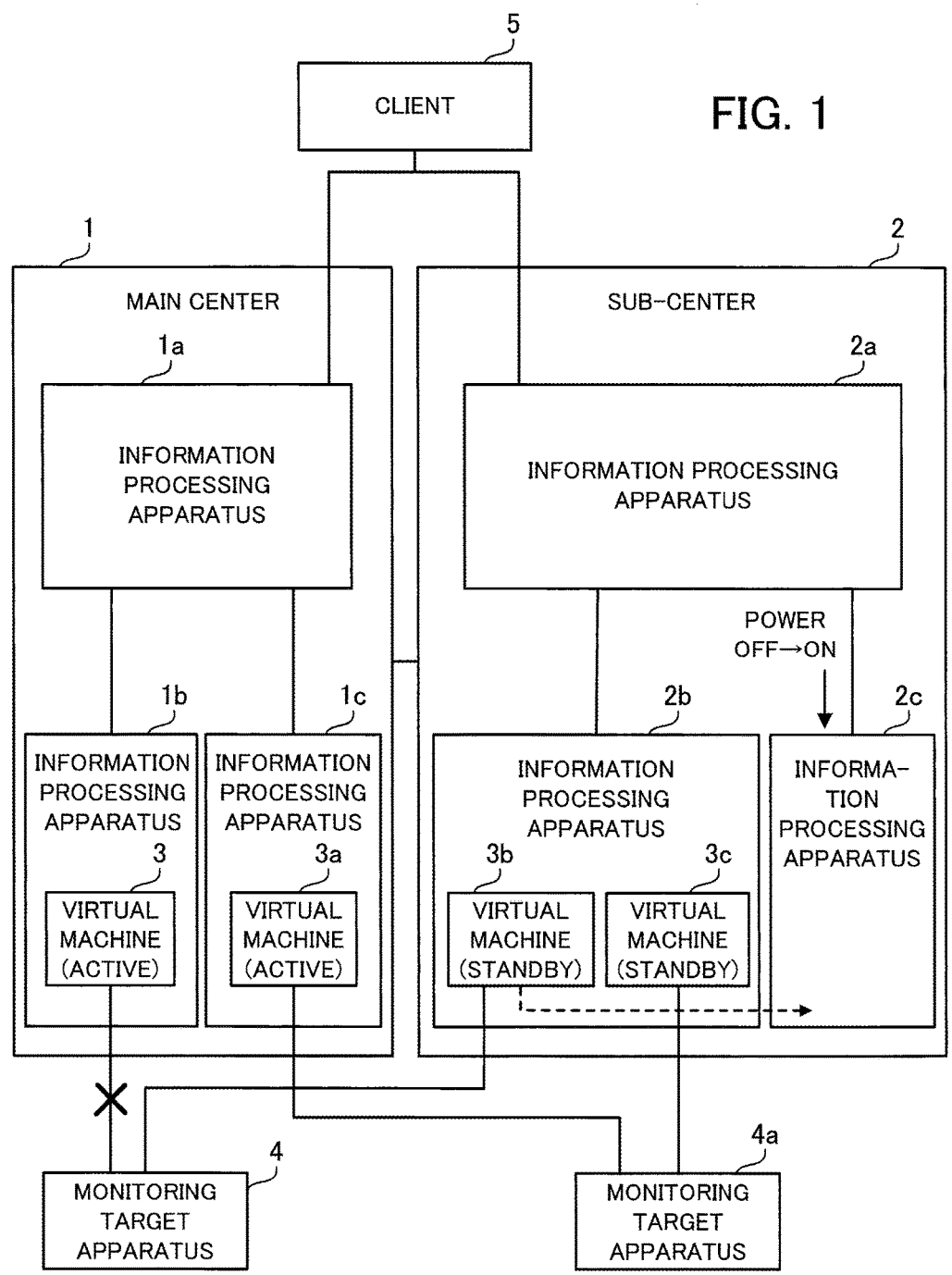
FIG. 1 illustrates a network monitoring system according to a first embodiment.

Several embodiments will be described below with reference to the accompanying drawings, wherein like reference numerals refer to like elements throughout.

First Embodiment

FIG. 1 illustrates a network monitoring system according to a first embodiment. The network monitoring system includes a main center 1, a sub-center 2, and monitoring target apparatuses 4 and 4a. The main center 1 includes information processing apparatuses 1a to 1c. The sub-center 2 includes information processing apparatuses 2a to 2c. For example, the main center 1 and the sub-center 2 are data centers. The main center 1 and the sub-center 2 may include information processing apparatuses other than the information processing apparatuses 1a to 1c and 2a to 2c, respectively. The network monitoring system realizes hot-standby redundancy by using the main center 1 as an active system and the sub-center 2 as a standby system. In the network monitoring system, both a virtual machine operated on an information processing apparatus that belongs to the main center 1 and a virtual machine operated on an information processing apparatus that belongs to the sub-center 2 monitor a single monitoring target apparatus. In this way, even if the virtual machine operated on the information processing apparatus that belongs to the main center 1 fails the monitoring of the monitoring target apparatus, the virtual machine operated on the information processing apparatus that belongs to the sub-center 2 continues the monitoring of the monitoring target apparatus. For example, the monitoring target apparatus is a transmission apparatus.

The information processing apparatus 1a manages virtual machines 3 and 3a that are operated by using resource of the information processing apparatuses 1b and 1c. When requested by a client 5 connectable to the main center 1 to provide monitoring information indicating a monitored status, the information processing apparatus 1a transmits the requested information to the client 5.

The information processing apparatus 1b operates the virtual machine 3 that monitors the monitoring target apparatus 4. The virtual machine 3 is an active virtual machine. To operate the virtual machine 3, a hypervisor included in the information processing apparatus 1b allocates resource of the information processing apparatus 1b to the virtual machine 3. The information processing apparatus 1b allocates sufficient resource to the virtual machine 3 so that the virtual machine 3 is allowed to process predetermined load received from the monitoring target apparatus 4. For example, the predetermined load is the maximum possible load to which the virtual machine 3 is subjected. For example, the virtual machine 3 is subjected to the maximum possible load when the virtual machine 3 receives a large number of messages (alarms) notifying that an abnormality has occurred from the monitoring target apparatus 4.

The information processing apparatus 1c operates the virtual machine 3a that monitors the monitoring target apparatus 4a. The virtual machine 3a is an active virtual machine. To operate the virtual machine 3a, a hypervisor included in the information processing apparatus 1c allocates resource of the information processing apparatus 1c to the virtual machine 3a. The information processing apparatus 1c allocates sufficient resource to the virtual machine 3a so that the virtual machine 3a can process predetermined load received from the monitoring target apparatus 4a.

The information processing apparatus 2a manages virtual machines 3b and 3c that are operated by using resource of the information processing apparatus 2b. When requested by the client 5 connectable to the sub-center 2 to provide monitoring information indicating a monitored status, the information processing apparatus 2a transmits the requested information to the client 5.

The information processing apparatus 2b operates the virtual machines 3b and 3c that monitor the monitoring target apparatuses 4 and 4a, respectively. The virtual machines 3b and 3c are standby virtual machines. To operate the virtual machines 3b and 3c, a hypervisor included in the information processing apparatus 2b allocates resource of the information processing apparatus 2b to each of the virtual machines 3b and 3c. The information processing apparatus 2b allocates resource less than that for processing the predetermined load (for example, the maximum load) to the virtual machine 3b. For example, to the virtual machine 3b, the information processing apparatus 2b allocates resource sufficient for processing the messages transmitted from the monitoring target apparatus 4 in a normal operation. In addition, to the virtual machine 3c, the information processing apparatus 2b allocates resource less than that for processing the predetermined load. The sum of the resource allocated to the virtual machines 3b and 3c does not exceed the amount of resource for processing the predetermined loads.

Both the virtual machines 3 and 3b monitor the monitoring target apparatus 4. The monitoring target apparatus 4 notifies each of the virtual machines 3 and 3b of its operating status. Since the virtual machines 3 and 3b are notified of the same operating status, the virtual machines 3 and 3b receive the same amount of load from the monitoring target apparatus 4. Namely, the active virtual machine and the standby virtual machine receive the same amount of load from the monitoring target apparatus 4 that is monitored by both of the virtual machines.

Both the virtual machines 3a and 3c monitor the monitoring target apparatus 4a. The monitoring target apparatus 4a notifies each of the virtual machines 3a and 3c of its operating status.

For example, even in a normal operation, namely, even when a standby virtual machine is not subjected to corresponding predetermined load from a corresponding monitoring target apparatus, in preparation for reception of the predetermined load by a corresponding active virtual machine in the main center 1, sufficient resource for processing the predetermined load could be allocated to the standby virtual machine. However, since the virtual machine is not subjected to the predetermined load from such a monitoring target apparatus in a normal operation, the virtual machine does not fully use its resource. Therefore, in a normal operation, a plurality of standby virtual machines is caused to operate on a common information processing apparatus.

For example, assuming that the virtual machine 3b has originally been operated on the information processing apparatus 2c, the information processing apparatus 2c migrates the virtual machine 3b to the information processing apparatus 2b. Migration is a technique for moving a software system that has been operated on one information processing apparatus to another information processing apparatus so that the migrated software system is operated on the migration-destination information processing apparatus. This migration technique is applicable to virtual machines.

The information processing apparatus 2b allocates less resource than that for processing the corresponding predetermined load to the standby virtual machine 3b. Since the virtual machine 3b has been migrated, the power of the information processing apparatus 2c can be turned off. As a result, the sum of the resource included in the information processing apparatuses that belong to the standby sub-center 2 is reduced. In this way, it is possible to reduce the standby resource and cause the virtual machine 3b to continuously monitor the monitoring target apparatus 4. In addition, by turning off the power of the information processing apparatus 2c, the power consumption of the standby sub-center 2 is also reduced.

In contrast, in a normal operation, the active virtual machine 3 is not migrated to the information processing apparatus 1c that belongs to the active main center 1. This is because, for example, if less resource than that for processing the corresponding predetermined load is allocated to the virtual machine 3, the virtual machine 3 is unable to process the predetermined load from the monitoring target apparatus 4. Namely, the active virtual machine 3 needs to be prepared for processing the possible predetermined load transmitted from the monitoring processing apparatus 4.

If an abnormality occurs in the monitoring of the monitoring target apparatus 4 by the virtual machine 3, the information processing apparatus 2b migrates the virtual machine 3b back to the information processing apparatus 2c capable of allocating sufficient resource for processing the corresponding predetermined load to the virtual machine 3b. After migrated, the virtual machine 3b is provided by the information processing apparatus 2c with sufficient resource for processing the predetermined load. When the above migration is performed, the power of the information processing apparatus 2c is turned on by the information processing apparatus 2a. Examples of the abnormality detected in the monitoring of the monitoring target apparatus 4 include: communication failure between the virtual machine 3 and the monitoring target apparatus 4; and packet loss caused by congestion between the virtual machine 3 and the monitoring target apparatus 4. In this way, since the information processing apparatus 2b migrates the virtual machine 3b back to the information processing apparatus 2c, the virtual machine 3b continuously monitors the monitoring target apparatus 4. In addition, the virtual machine 3b is capable of processing the predetermined load received from the monitoring target apparatus 4. Namely, by migrating the virtual machine 3b, which has previously been operated on the information processing apparatus 2b, back to the information processing apparatus 2c, even when the virtual machine 3b is subjected to the maximum load, the virtual machine 3b continuously performs monitoring processing without interruption. Thus, the reliability of the network monitoring system is maintained.

According to the first embodiment, in a normal operation, the virtual machine 3b is operated on the information processing apparatus 2b, and the power of the information processing apparatus 2c is turned off. As a result, since the sum of the resource in the information processing apparatuses that belong to the standby sub-center 2 is reduced, the power consumption is reduced. In addition, if an abnormality occurs in the monitoring of the monitoring target apparatus 4 by the virtual machine 3, the information processing apparatus 2b migrates the virtual machine 3b back to the information processing apparatus 2c capable of allocating sufficient resource for processing the predetermined load to the virtual machine 3b. In this way, the virtual machine 3b continuously monitors the monitoring target apparatus 4. In addition, the virtual machine 3b is capable of processing the predetermined load received from the monitoring target apparatus 4. Thus, the reliability provided by the network monitoring system having a hot-standby redundancy configuration is maintained. Namely, according to the first embodiment, it is possible to maintain the reliability of the network monitoring system while keeping the standby resource in a normal condition at a low level.

Second Embodiment

Figure 2:
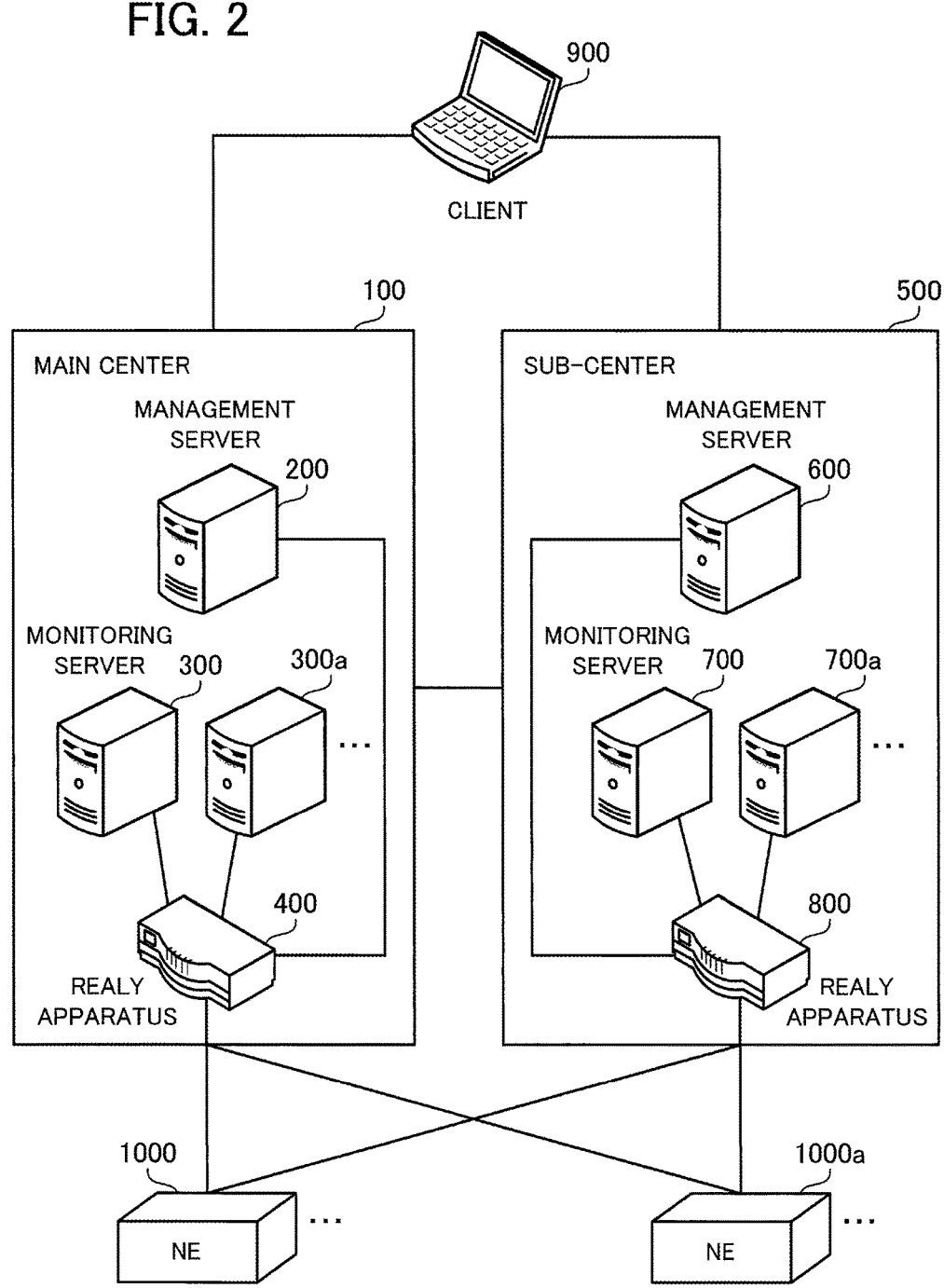
FIG. 2 illustrates a network monitoring system according to a second embodiment.

FIG. 2 illustrates a network monitoring system according to a second embodiment. The network monitoring system according to the second embodiment includes a main center 100, a sub-center 500, a client 900, and network elements (NEs) 1000, 1000a, and so on. The main center 100, the sub-center 500, the client 900, and the NEs 1000 and 1000a are connected with each other via a network. The network may be a local area network (LAN), a wide area network (WAN), or the Internet. The network monitoring system realizes hot-standby redundancy by arranging the main center 100 serving as an active system and the sub-center 500 serving as a standby system.

The main center 100 includes a management server 200, monitoring servers 300, 300a, and so on, and a relay apparatus 400. The sub-center 500 includes a management server 600, monitoring servers 700, 700a, and so on, and a relay apparatus 800.

In the network monitoring system, the management servers 200 and 600 that belong to the main center 100 and the sub-center 500 and virtual machines (VMs) that operate on the monitoring servers 300, 300a, 700, and 700a operate in coordination with each other.

The management servers 200 and 600 and the monitoring servers 300, 300a, 700, and 700a are server computers.

The relay apparatus 400 relays communication among the management server 200, the monitoring servers 300 and 300a, the sub-center 500, the client 900, and the NEs 1000 and 1000a. For example, the relay apparatus 400 is a switch or a router.

The relay apparatus 800 relays communication among the management server 600, the monitoring servers 700 and 700a, the main center 100, the client 900, and the NEs 1000 and 1000a. For example, the relay apparatus 800 is a switch or a router.

The client 900 is a client computer used by a user. While FIG. 2 illustrates the single client 900, a plurality of clients may exist. The NEs 1000 and 1000a are apparatuses for monitoring whether a network is operating properly. For example, the NEs 1000 and 1000a are transmission apparatuses.

Figure 3:
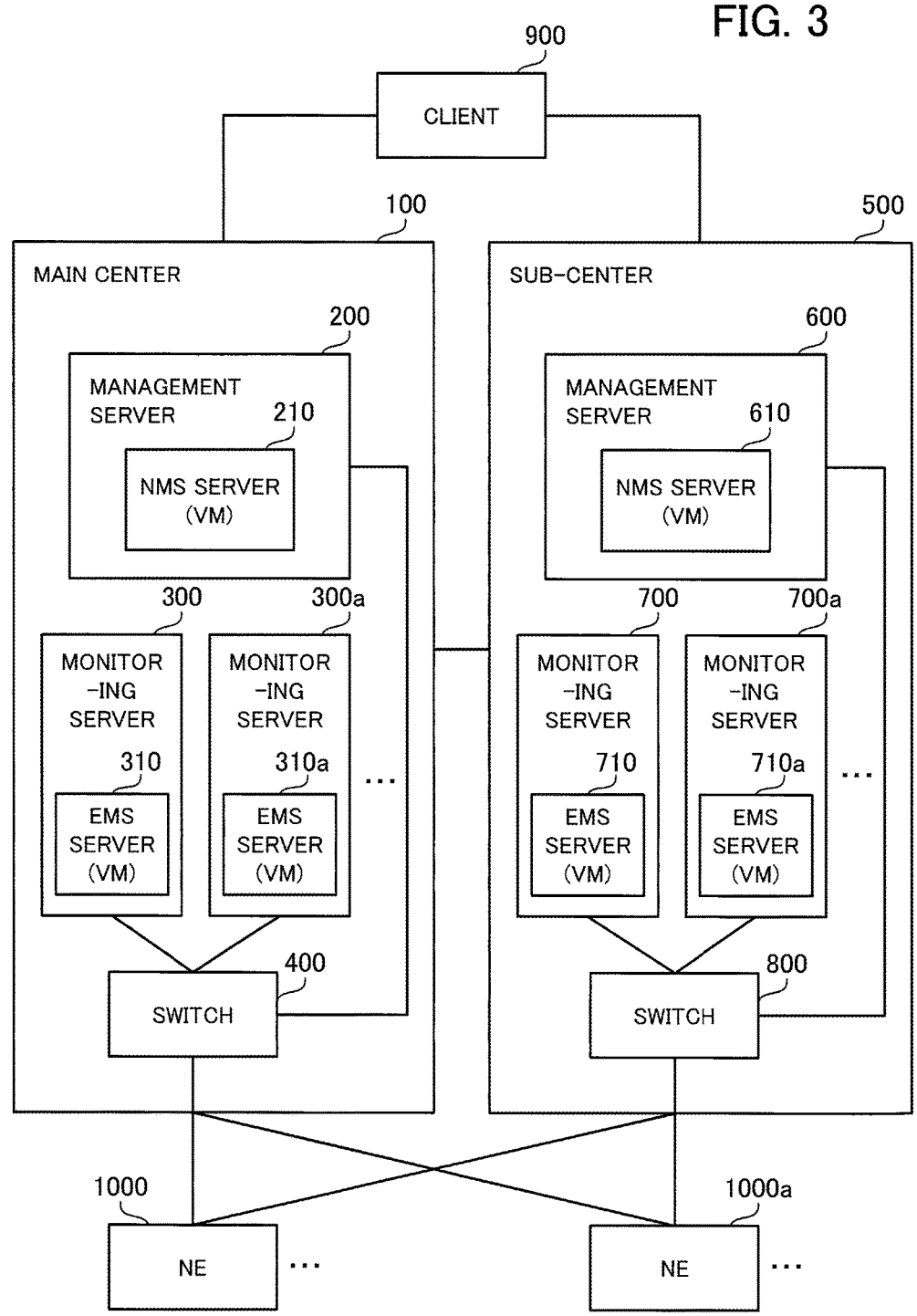
FIG. 3 illustrates exemplary virtual machines that operate on the network monitoring system according to the second embodiment.

FIG. 3 illustrates exemplary virtual machines operated in the network monitoring system according to the second embodiment. In the network monitoring system, each of the management servers 200 and 600 and the monitoring servers 300, 300a, 700, and 700a is capable of operating at least one virtual machine therein.

The management server 200 operates a network management system (NMS) server 210 as a virtual machine included therein. To operate the NMS server 210, a hypervisor included in the management server 200 allocates resource of the management server 200 to the NMS server 210.

The monitoring server 300 operates an element management system (EMS) server 310 as a virtual machine included therein. The monitoring server 300a operates an EMS server 310a as a virtual machine included therein. To operate the EMS server 310, a hypervisor included in the monitoring server 300 allocates resource of the monitoring server 300 to the EMS server 310. To operate the EMS server 310a, a hypervisor included in the monitoring server 300a allocates resource of the monitoring server 300a to the EMS server 310a.

The management server 600 operates an NMS server 610 as a virtual machine included therein. To operate the NMS server 610, a hypervisor included in the management server 600 allocates resource of the management server 600 to the NMS server 610.

The monitoring server 700 operates an EMS server 710 as a virtual machine included therein. The monitoring server 700a operates an EMS server 710a as a virtual machine included therein. To operate the EMS server 710, a hypervisor included in the monitoring server 700 allocates resource of the monitoring server 700 to the EMS server 710. To operate the EMS server 710a, a hypervisor included in the monitoring server 700a allocates resource of the monitoring server 700a to the EMS server 710a.

The NMS server 210 manages the EMS servers 310 and 310a. The EMS servers 310 and 310a monitor the NEs 1000 and 1000a, respectively. The EMS servers 310 and 310a transmit monitoring information indicating monitored statuses of the NEs 1000 and 1000a, respectively, to the NMS server 210.

The NMS server 610 manages the EMS servers 710 and 710a. The EMS servers 710 and 710a monitor the NEs 1000 and 1000a, respectively. The EMS servers 710 and 710a transmit monitoring information indicating monitored statuses of the NEs 1000 and 1000a, respectively, to the NMS server 610.

The client 900 requests the NMS server 210 or 610 to provide the client 900 with monitoring information indicating a monitored network status. The client 900 displays the monitored network status provided by the NMS server 210 or 610 on a screen of the client 900. In this way, a user of the client 900 grasps the monitored network status.

The NE 1000 notifies the EMS servers 310 and 710 whether the network monitored by the NE 1000 is operating properly. The NE 1000a notifies the EMS servers 310a and 710a whether the network monitored by the NE 1000a is operating properly.

In the network monitoring system, a single EMS server that belongs to the main center 100 and a single EMS server that belongs to the sub-center 500 monitor a single NE.

Figure 4:
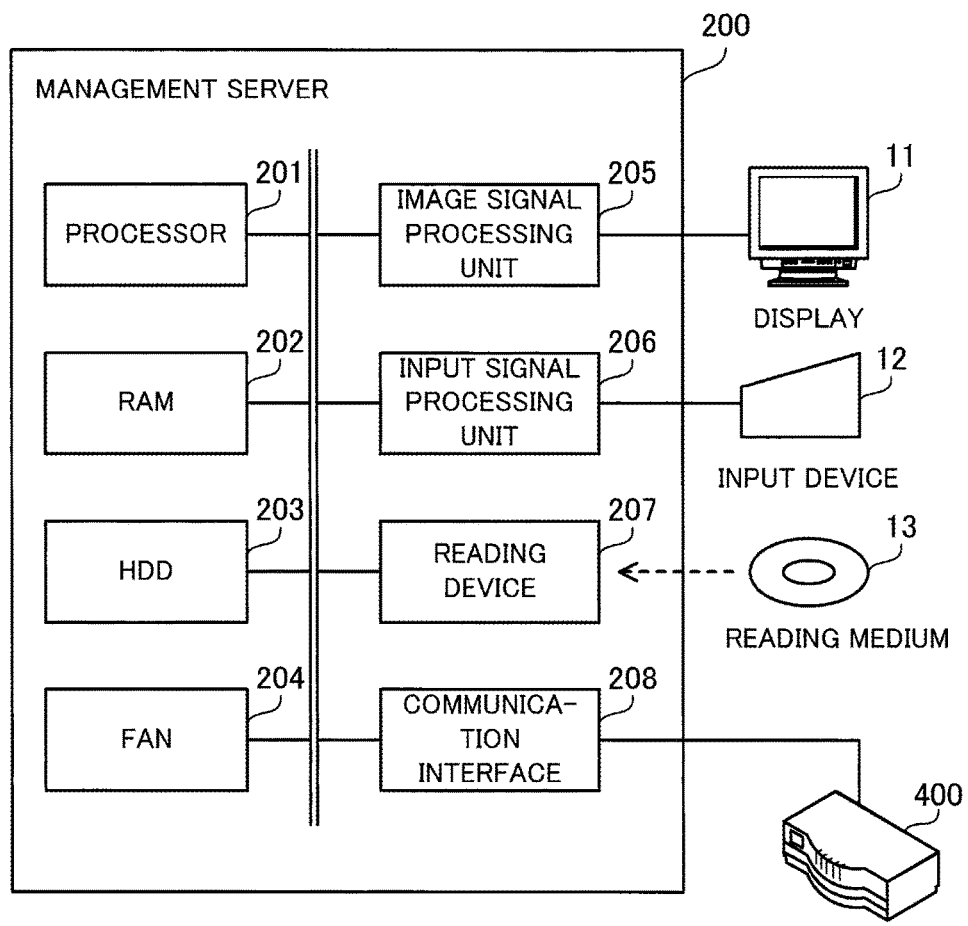
FIG. 4 illustrates an exemplary hardware configuration of a management server.

FIG. 4 illustrates an exemplary hardware configuration of the management server 200. The management server 200 includes a processor 201, a random access memory (RAM) 202, a hard disk drive (HDD) 203, a fan 204, an image signal processing unit 205, an input signal processing unit 206, a reading device 207, and a communication interface 208. Each of these units is connected to a bus of the management server 200.

The processor 201 comprehensively controls the management server 200. The processor 201 may be a multiprocessor that includes a plurality of processing elements. For example, the processor 210 is a central processing unit (CPU), a digital signal processor (DSP), an application specific integrated circuit (ASIC), or a field programmable gate array (FPGA). The processor 210 may be a combination of at least two of the following elements: a CPU, a DSP, an ASIC, an FPGA, etc.

The RAM 202 is a main storage device of the management server 200. At least a part of an operating system (OS) program or an application program executed by the processor 201 is temporarily stored in the RAM 202. In addition, various types of data used for processing by the processor 201 are stored in the RAM 202.

The HDD 203 is an auxiliary storage device of the management server 200. The HDD 203 magnetically writes and reads data in and from a magnetic disk therein. OS programs, application programs, and various types of data are stored in the HDD 203. The management server 200 may include a different type of auxiliary storage device such as a flash memory and a solid state drive (SDD). The management server 200 may include a plurality of auxiliary storage devices.

The fan 204 cools the management server 200. For example, the fan 204 cools the processor 201, which can otherwise be heated to a high temperature.

The image signal processing unit 205 outputs an image to a display 11 connected to the management server 200 in accordance with a command from the processor 201. Examples of the display 11 include various types of display devices such as a cathode ray tube (CRT) display, a liquid crystal display (LCD), and an organic electro-luminescence (EL) display.

The input signal processing unit 206 acquires input signals from an input device 12 connected to the management server 200 and outputs the acquired input signals to the processor 201. Examples of the input device 12 include various types of input devices. For example, the input device 12 may include a pointing device such as a mouse or a touch panel and a keyboard. A plurality of types of input devices may be connected to the management server 200.

The reading device 207 reads programs and data recorded in a recording medium 13. For example, a magnetic disk such as a flexible disk (FD) and an HDD, an optical disc such as a compact disc (CD) and a digital versatile disc (DVD), or a magneto-optical disk (MO) may be used as the recording medium 13. In addition, a non-volatile semiconductor storage device such as a flash memory card may be used as the recording medium 13. For example, the reading device 207 stores programs and data read from the recording medium 13 in the RAM 202 or the HDD 203 in accordance with a command from the processor 201.

The communication interface 208 communicates with the monitoring servers 300 and 300a, the sub-center 500, and the client 900 via the relay apparatus 400.

The management server 600 and the monitoring servers 300, 300a, 700, and 700a are realized by using the same hardware configuration as that of the management server 200.

Figure 5:
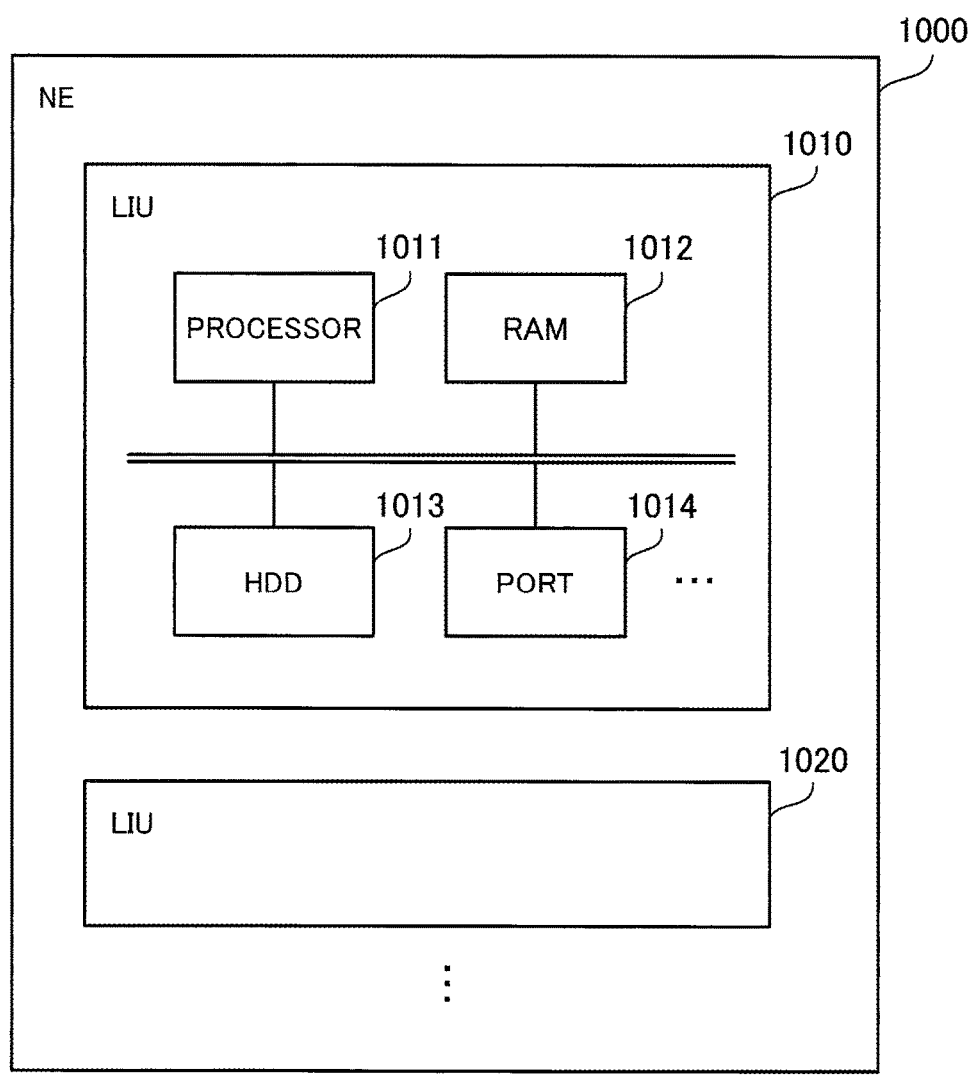
FIG. 5 illustrates an exemplary hardware configuration of a network element (NE)

FIG. 5 illustrates an exemplary hardware configuration of the NE 1000. The NE 1000 includes line interface units (LIUs) 1010, 1020, and so on. The LIU 1010 includes a processor 1011, a RAM 1012, an HDD 1013, and at least one port 1014. Each of these units is connected to a bus of the LIU 1010.

The processor 1011 comprehensively controls the LIU 1010. The processor 1011 may be a multiprocessor that includes a plurality of processing elements. For example, the processor 1011 is a CPU, a DSP, an ASIC, or an FPGA. The processor 1011 may be a combination of at least two of the following elements: a CPU, a DSP, an ASIC, an FPGA, etc.

The RAM 1012 is a main storage device of the LIU 1010. At least a part of an OS program or an application program executed by the processor 1011 is temporarily stored in the RAM 1012. In addition, various types of data used for processing by the processor 1011 are stored in the RAM 1012.

The HDD 1013 is an auxiliary storage device of the LIU 1010. The HDD 1013 magnetically writes and reads data in and from a magnetic disk therein. OS programs, application programs, and various types of data are stored in the HDD 1013. The LIU 1010 may include a different type of auxiliary storage device such as a flash memory and a solid state drive (SSD). The management server 200 may include a plurality of auxiliary storage devices.

The port 1014 is an interface for exchanging data with an apparatus connected to a network monitored by the main center 100, the sub-center 500, and the NE 1000 via the network.

The LIU 1020 may be realized by using the same hardware configuration as that of the LIU 1010.

Figure 6:
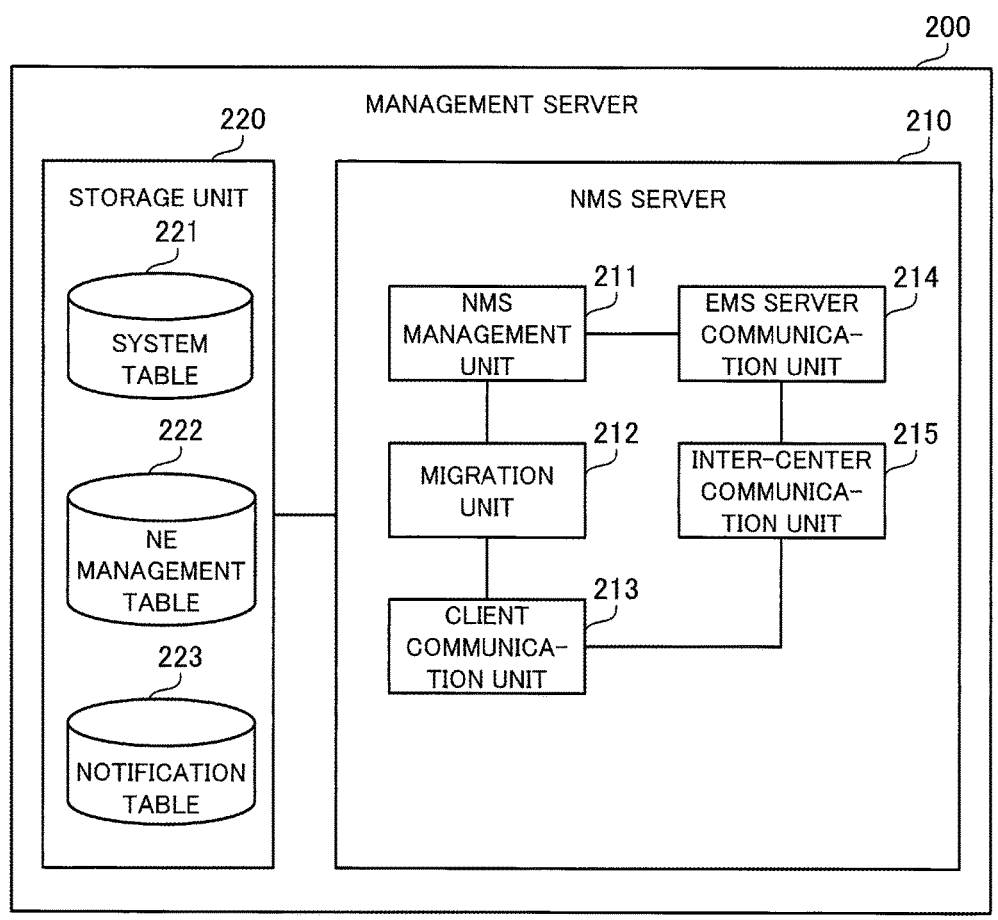
FIG. 6 illustrates exemplary functions of a management server that belongs to a main center.

FIG. 6 illustrates exemplary functions of the management server 200 that belongs to the main center 100. The management server 200 includes the NMS server 210 and a storage unit 220. The NMS server 210 includes an NMS management unit 211, a migration unit 212, a client communication unit 213, an EMS server communication unit 214, and an inter-center communication unit 215. The NMS management unit 211, the migration unit 212, the client communication unit 213, the EMS server communication unit 214, and the inter-center communication unit 215 communicate with each other.

For example, the storage unit 220 is implemented as a storage area in the RAM 202 or the HDD 203. The storage unit 220 holds information used for processing performed by the NMS management unit 211 and the migration unit 212. A system table 221, an NE management table 222, and a notification table 223 are stored in the storage unit 220. Information indicating operation statuses of the NMS and EMS servers that belong to the main center 100 is registered in the system table 221. Information indicating monitored statuses of the NEs monitored by the EMS servers is registered in the NE management table 222. Information supplied from the NEs is registered in the notification table 223.

In addition, the storage unit 220 holds load information, threshold information, and communication status information. The load information represents the amount of resource allocated to the NMS server 210 by the hypervisor included in the management server 200. The threshold information is an index value used for determining whether to perform or cancel a degradation operation as will be described below. For example, the threshold corresponds to use of 70% or more of the entire resource of the management server 200. The communication status information represents communication statuses between the EMS servers managed by the NMS server 210 and the NEs monitored by the EMS servers.

In addition, the storage unit 220 holds an address assigned to the NMS server 210 that belongs to the main center 100 and addresses assigned to the EMS servers managed by the NMS server 210. The storage unit 220 also holds an address assigned to the NMS server 610 that belongs to the sub-center 500 and addresses assigned to the EMS servers managed by the NMS server 610.

The NMS management unit 211 periodically acquires information about the load on each of the EMS servers managed by the NMS server 210. The NMS management unit 211 transmits the acquired load information to the migration unit 212. In addition, if the NMS management unit 211 is notified of detection of an abnormality by an EMS server managed by the NMS server 210, the NMS management unit 211 determines whether to perform system-switching between active and standby EMS servers. If the NMS management unit 211 determines to perform the system-switching, the NMS management unit 211 registers relevant information in the system table 221.

The NMS management unit 211 registers monitored statuses of the NEs acquired from the EMS servers managed by the NMS server 210 in the NE management table 222. If the NMS management unit 221 is notified of detection of an abnormality by an EMS server, the NMS management unit 211 registers relevant information in the notification table 223.

When requested by the client 900 to provide a monitored status, the NMS management unit 211 provides the client 900 with the requested monitored status.

The migration unit 212 determines whether to perform a degradation operation on an EMS server managed by the NMS server 210 on the basis of the load information transmitted from the NMS management unit 211. If the migration unit 212 determines to perform the degradation operation, the migration unit 212 determines a migration destination and migrates the EMS server to the migration destination. If the NMS management unit 211 is notified by a degraded EMS server that the load thereof has exceeded a threshold, the migration unit 212 cancels the degradation operation.

The client communication unit 213 exchanges data with the client 900. The EMS server communication unit 214 exchanges data with the EMS servers managed by the NMS server 210. The inter-center communication unit 215 exchanges data with the sub-center 500.

Figure 7:
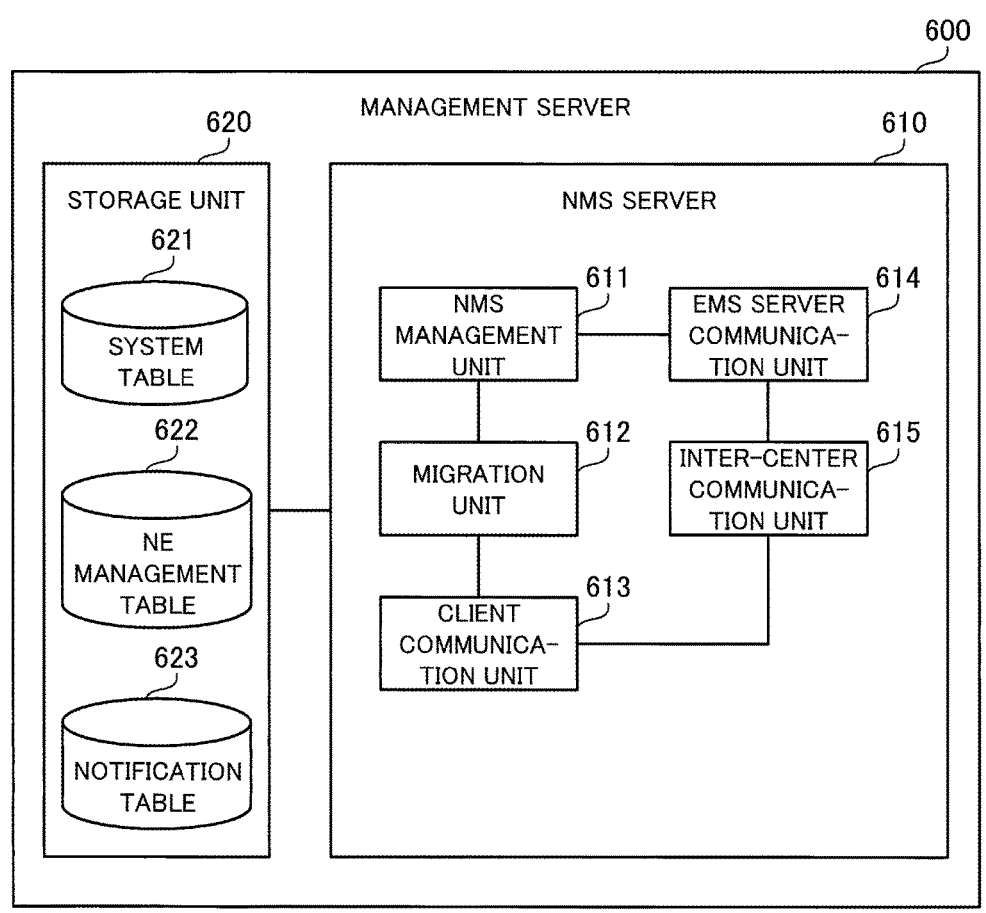
FIG. 7 illustrates exemplary functions of a management server that belongs to a sub-center.

FIG. 7 illustrates exemplary functions of the management server 600 that belongs to the sub-center 500. The management server 600 includes the NMS server 610 and a storage unit 620. The NMS server 610 includes an NMS management unit 611, a migration unit 612, a client communication unit 613, an EMS server communication unit 614, and an inter-center communication unit 615. The storage unit 620 holds a system table 621, an NE management table 622, and a notification table 623. Since these function units operate in a similar way to those included in the NMS server 210 and the storage unit 220, redundant description thereof will be omitted. In addition, the following functions are added, in addition to the functions of the NMS server 210.

The NMS management unit 611 periodically acquires information about the load on the NMS server 610. The NMS management unit 611 transmits the acquired load information to the migration unit 612.

The NMS management unit 611 periodically acquires communication status information from the storage unit 620. The NMS management unit 611 transmits the acquired communication status information to the main center 100 via the inter-center communication unit 615.

If the NMS management unit 211 detects that load information has exceeded a threshold, the migration unit 612 migrates the corresponding EMS server, on which a degradation operation has been performed by the management server 600, back to the migration source.

In addition, the NE management tables 222 and 622 are synchronized with each other. If not, the NMS management unit 211 or 611 synchronizes the management tables 222 and 622.

Figure 8:
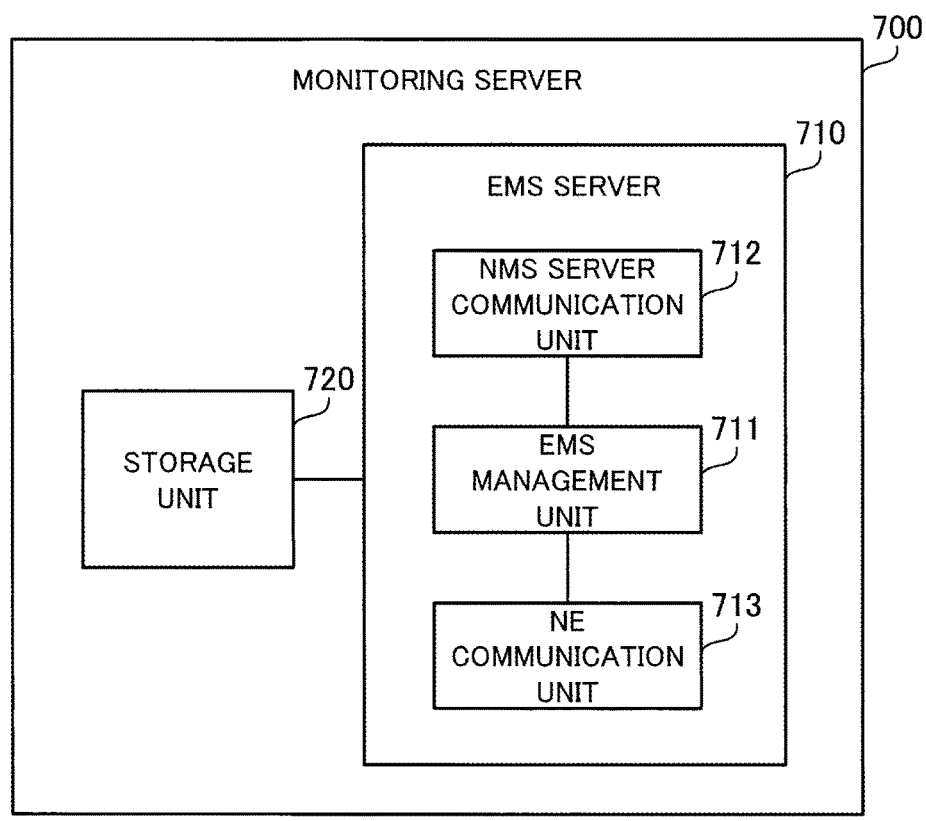
FIG. 8 illustrates exemplary functions of a monitoring server.

FIG. 8 illustrates exemplary functions of a monitoring server. The monitoring servers that belong to the main center 100 and the monitoring servers that belong to the sub-center 500 have the same functions. Therefore, in FIG. 8, the functions of the monitoring server 700 will be described. The monitoring server 700 includes the EMS server 710 and a storage unit 720. The EMS server 710 includes an EMS management unit 711, an NMS server communication unit 712, and an NE communication unit 713. The EMS management unit 711, the NMS server communication unit 712, and the NE communication unit 713 communicate with each other.

The storage unit 720 holds load information and threshold information. The load information represents the amount of resource allocated to the EMS server 710 by the hypervisor included in the monitoring server 700. The threshold information is an index value used for determining whether to perform or cancel a degradation operation as will be described below. For example, the threshold corresponds to use of 70% or more of the entire resource of the monitoring server 700.

The EMS management unit 711 acquires the load information or the threshold information from the storage unit 720 and transmits the acquired information to the NMS server 610 via the NMS server communication unit 712. The EMS management unit 711 transmits monitoring information indicating a monitored status of a monitoring target NE to the NMS server 610 via the NMS server communication unit 712. In addition, if the EMS management unit 711 is notified of detection of an abnormality by a monitoring target NE, the EMS management unit 711 transmits a notification message to the NMS server 610 via the NMS server communication unit 712. If the load information has exceeded a threshold, the EMS management unit 711 transmits a message notifying that the load information has exceeded the threshold to the NMS server 610 via the NMS server communication unit 712.

The NMS server communication unit 712 exchanges data with the NMS server 610. The NE communication unit 713 exchanges data with the NE monitored by the EMS server 710. Data that the NE communication unit 713 receives from the NE monitored by the EMS server 710 is also referred to as a trap notification.

FIG. 9 illustrates an exemplary system table 221 included in the management server 200 that belongs to the main center 100. The system table 221 is stored in the storage unit 220 and includes columns for "SYSTEM," "TYPE," "EMS NUMBER," "NAME," "OPERATION STATUS," "MIGRATION DESTINATION," and "SWITCHOVER OCCURRENCE TIME." For each entry, in a box under "SYSTEM," information indicating the main center 100 or the sub-center 500 is registered. In a box under the column "TYPE," information indicating an NMS server or an EMS server is registered. In a box under the column "EMS NUMBER," when applicable, a number for identifying an EMS server is registered. In a box under the column "NAME," a name of the corresponding NMS or EMS server is registered. In a box under the column "OPERATION STATUS," information indicating whether the corresponding server is operated in an active system or a standby system is registered. In a box under the column "MIGRATION DESTINATION," a migration destination of the corresponding EMS server is registered. In a box under the column "SWITCHOVER OCCURRENCE TIME," time of occurrence of system-switching is registered.

For example, the system table 221 includes an entry including "MAIN" under the column "SYSTEM," "NMS" under the column "TYPE," "-" under the column "EMS NUMBER," "NMS SERVER N1" under the column "NAME," "ACT" under the column "OPERATION STATUS," "-" under the column "MIGRATION DESTINATION," and "-" under the column "SWITCHOVER OCCURRENCE TIME." This entry indicates that the NMS server N1 belongs to the main center 100 and is an active (ACT) virtual machine.

The system table 221 also includes an entry indicating "MAIN" under the column "SYSTEM," "EMS" under the column "TYPE," "1" under the column "EMS NUMBER," "EMS SERVER E1" under the column "NAME," "ACT" under the column "OPERATION STATUS," "-" under the column "MIGRATION DESTINATION," and "2014/04/10 10:10:10" under the column "SWITCHOVER OCCURRENCE TIME." This entry indicates that the EMS number of the EMS server E1 is 1 and that the EMS server E1 belongs to the main center 100. In addition, the EMS server E1 is an active (ACT) virtual machine, and the EMS server E1 is not degraded. In addition, time of occurrence of system-switching on the EMS 1 is 2014/04/10 10:10:10.

FIG. 10 illustrates an exemplary system table 621 included in the management server 600 that belongs to the sub-center 500. The system table 621 is stored in the storage unit 620 and includes columns for "SYSTEM," "TYPE," "EMS NUMBER," "NAME," "OPERATION STATUS," "MIGRATION DESTINATION," and "SWITCHOVER OCCURRENCE TIME." Since the system table 621 includes the same columns as those in the system table 221, redundant description thereof will be omitted.

For example, the system table 621 includes an entry indicating "SUB" under the column "SYSTEM," "EMS" under the column "TYPE," "11" under the column "EMS NUMBER," "EMS SERVER E11" under the column "NAME," "STBY" under the column "OPERATION STATUS," "MANAGEMENT SERVER 600" under the column "MIGRATION DESTINATION," and "2014/04/10 10:10:10" under the column "SWITCHOVER OCCURRENCE TIME." This entry indicates that the EMS number of the EMS server E11 is 11 and that the EMS server E11 belongs to the sub-center 500. In addition, the EMS server E11 is a standby (STBY) virtual machine, and the EMS server E11 has been migrated to the MANAGEMENT SEVER 600. In addition, time of occurrence of the system-switching on the EMS server E11 is 2014/04/10 10:10:10.

FIG. 11 illustrates an exemplary NE management table 222 included in the management server 200 that belongs to the main center 100. The NE management table 222 is stored in the storage unit 220 and includes columns for "NE NUMBER," "NAME," "MONITORING SERVER," "IP ADDRESS," "MONITORED STATUS," and "ABNORMALITY OCCURRENCE TIME."

For each entry, in a box under the column "NE NUMBER," a number for identifying an NE is registered. In a box under the column "NAME," a name of the corresponding NE is registered. In a box under the column "MONITORING SERVER," names of monitoring servers that monitor the corresponding NE are registered. In a box under the column "IP ADDRESS," an IP address of the corresponding NE is registered. In a box under the column "MONITORED STATUS," information indicating whether monitoring is properly being performed is registered. In a box under the column "ABNORMALITY OCCURRENCE TIME," time of occurrence of an abnormality is registered.

For example, the NE management table 222 includes an entry indicating "1" under the column "NE NUMBER," "NE10a" under the column "NAME," "EMS SERVER E11" under the column "MONITORING SERVER," "192.168.101.101" under the column "IP ADDRESS," "NORMAL" under the column "MONITORED STATUS," and "-" under the column "ABNORMALITY OCCURRENCE TIME." This entry indicates that a name of the NE having 1 as its NE number is NE 10a and that an IP address assigned to the NE 10a is 192.168.101.101. In addition, the NE10a is being monitored by the EMS server E11, and a monitored status of the NE10a is normal.

FIG. 12 illustrates an exemplary NE management table 622 included in the management server 600 that belongs to the sub-center 500. The NE management table 622 is stored in the storage unit 620 and includes columns for "NE NUMBER," "NAME," "MONITORING SERVER," "IP ADDRESS," "MONITORED STATUS," and "ABNORMALITY OCCURRENCE TIME." Since the NE management table 622 includes the same columns as those included in the NE management table 222, redundant description thereof will be omitted.

For example, the NE management table 622 includes an entry indicating "11" under the column "NE NUMBER," "NE10e" under the column "NAME," "EMS SERVER E2" under the column "MONITORING SERVER," "192.168.120.101" under the column "IP ADDRESS," "ABNORMAL" under the column "MONITORED STATUS," and "2014/04/15 15:15:20" under the column "ABNORMALITY OCCURRENCE TIME." This entry indicates that a name of the NE having 11 as its NE number is NE 10e and that an IP address assigned to the NE 10a is 192.168.120.101. In addition, the NE 10e is being monitored by the EMS server E2, and a monitored status of the NE10e is abnormal. In addition, time of occurrence of an abnormality is 2014/04/15 15:15:20.

FIG. 13 illustrates an exemplary notification table 223 included in the management server 200 that belongs to the main center 100. The notification table 223 is stored in the storage unit 220 and includes columns for "DATE AND TIME," "ALARM NAME," "NE NUMBER," and "SEVERITY."

For each entry, in a box under the column "DATE AND TIME," information indicating date and time is registered. In a box under the column "ALARM NAME," information indicating the content of the alarm is registered. In a box under the column "NE NUMBER," a number for identifying a corresponding NE is registered. In a box under the column "SEVERITY," information indicating severity of the alarm content is registered.

For example, the notification table 223 includes an entry indicating "2013/12/20 20:30:10" under the column "DATE AND TIME," "LINK DOWN" under the column "ALARM NAME," "2" under the column "NE NUMBER," and "CRITICAL" under the column "SEVERITY." This entry indicates that the date and time of occurrence of an abnormality is 2013/12/20 20:30:10 and that the communication with this NE having the NE number 2 has failed since the corresponding network has been disconnected (LINK DOWN). In addition, severity of this condition is indicated as critical.

Since the notification table 623 included in the management server 600 that belongs to the sub-center 500 includes the same columns as those of the notification table 223, redundant description thereof will be omitted.

Figure 14:
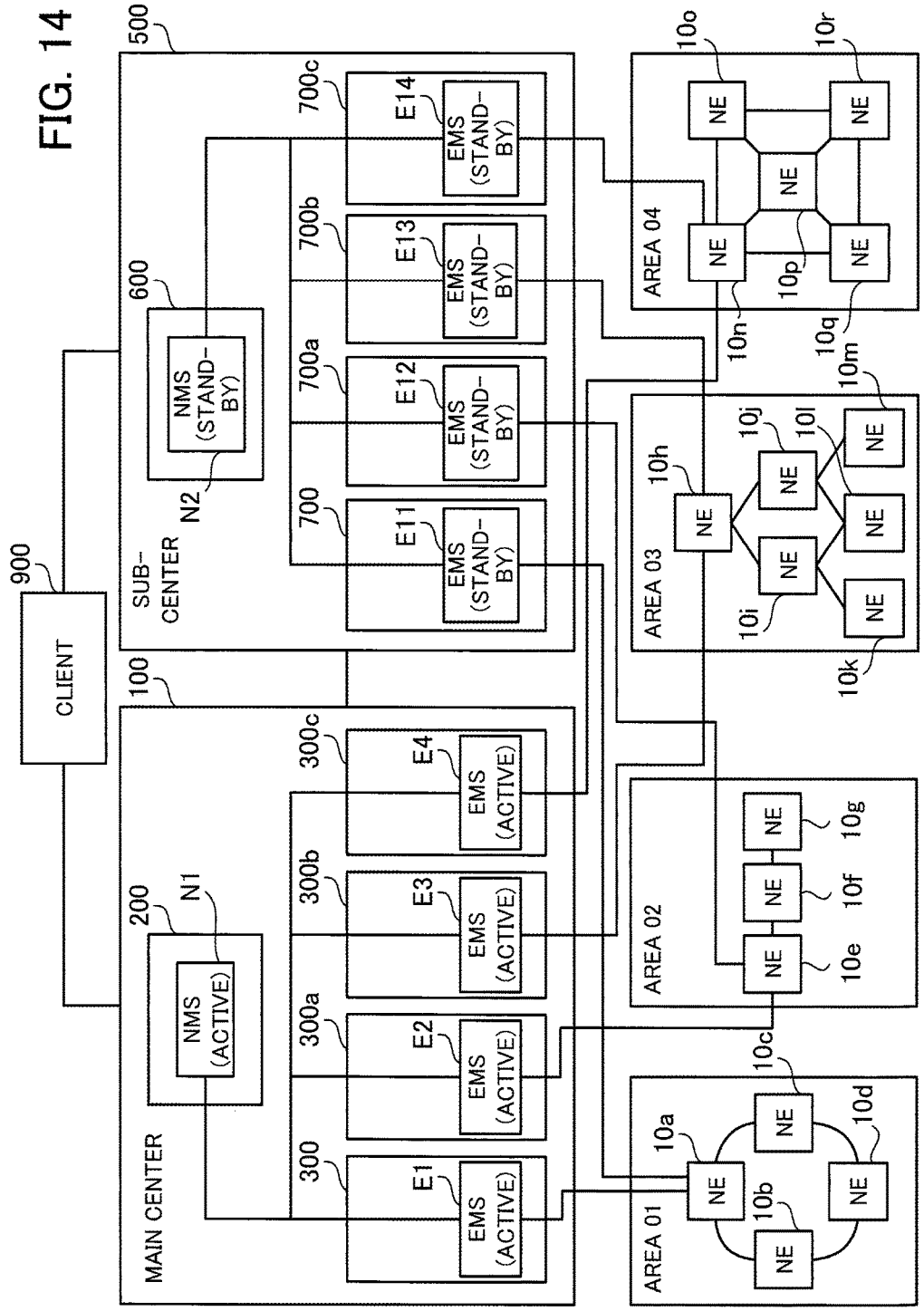
FIGS. 14 to 18 illustrate first to fifth specific examples of processing performed in the network monitoring system, respectively.

FIG. 14 illustrates a first specific example of processing performed in the network monitoring system. The main center 100 includes the management server 200 and the monitoring servers 300, 300a, 300b, and 300c. The sub-center 500 includes the management server 600 and the monitoring servers 700, 700a, 700b, and 700c.

The management server 200 operates an active NMS server N1. The monitoring servers 300, 300a, 300b, and 300c operate active EMS servers E1, E2, E3, and E4, respectively.

The management server 600 operates a standby NMS server N2. The monitoring servers 700, 700a, 700b, and 700c operate standby EMS servers E11, E12, E13, and E14, respectively.

NEs 10a to 10d, NEs 10e to 10g, NEs 10h to 10m, and NEs 10n to 10r are arranged in areas 01, 02, 03, and 04, respectively. The NEs arranged in the same area communicate with each other.

The EMS servers E1 and E11, the EMS servers E2 and E12, the EMS servers E3 and E13, and the EMS servers E4 and E14 monitor the NE 10a, the NE 10e, the NE 10h, and the NE 10n, respectively. In addition, the EMS servers E1 and E11 may monitor the NEs 10b to 10d via the NE 10a. The EMS servers E2 and E12 may monitor the NEs 10f and 10g via the NE 10e. The EMS servers E3 and E13 may monitor the NEs 10i to 10m via the NE 10h. The EMS servers E4 and E14 may monitor the NEs 10o to 10r via the NE 10n.

Each of the active EMS servers E1 to E4 and the standby EMS servers E11 to E14 is provided with sufficient resource for processing its maximum load, for example, a large number of messages (alarms) notifying occurrence of abnormalities from corresponding monitoring target NEs.

Each of an active EMS server and a standby EMS server that form a pair receives the same amount of load from their monitoring target NEs.

In FIG. 14, to clarify a network connection relationship, elements having a connection relationship are connected by a line. The same applies to the specific examples illustrated in FIGS. 15 to 18.

Figure 15:
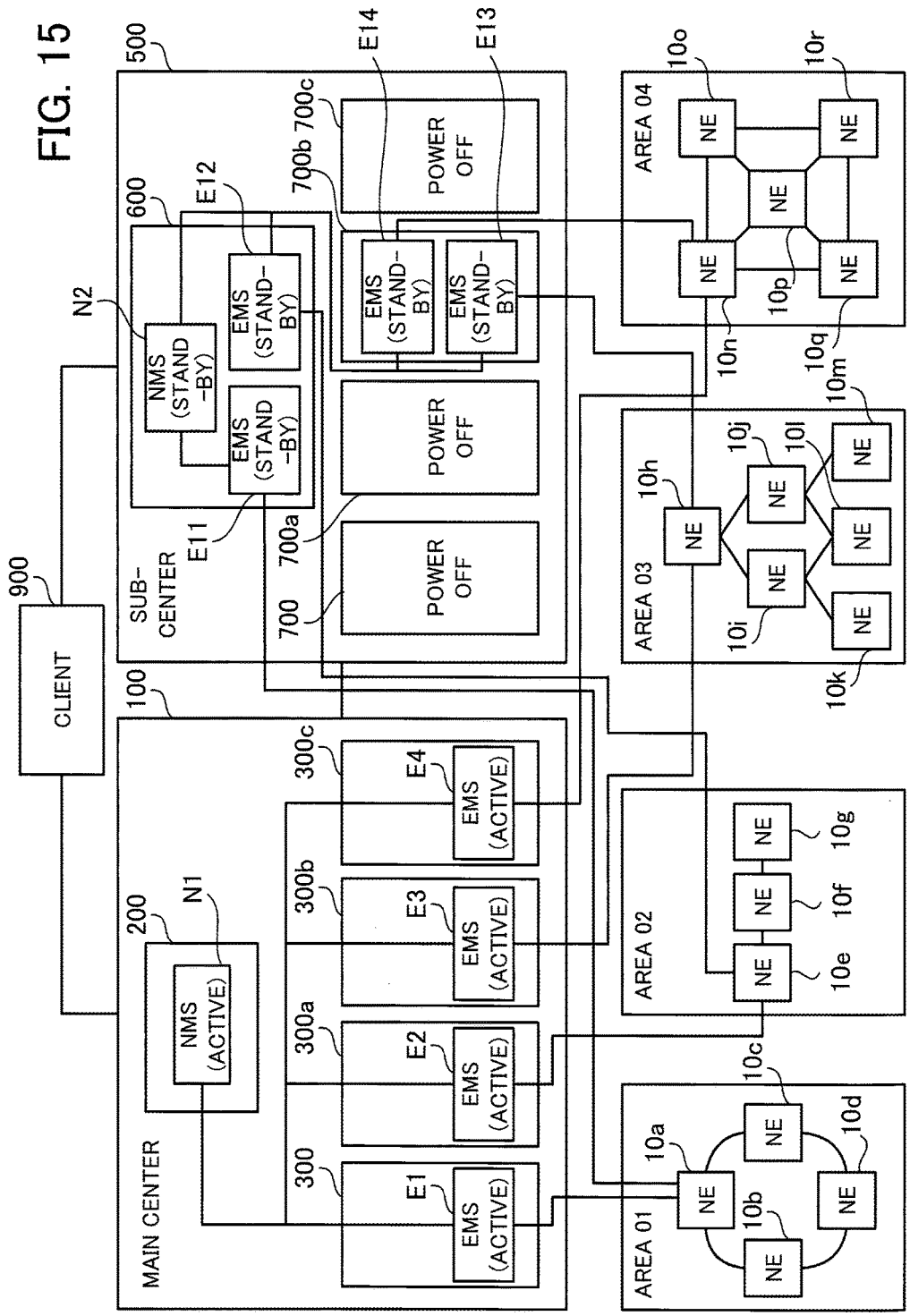

FIG. 15 illustrates a second specific example of processing performed in the network monitoring system. In FIG. 15, the EMS servers E11 and E12 have been migrated to the management server 600. In addition, in FIG. 15, the EMS server E14 has been migrated to the monitoring server 700b. Hereinafter, a degradation operation performed on an EMS server will be described.

The NMS management unit 611 refers to the system table 621 and determines whether any STBY (standby) EMS servers exist. The NMS management unit 611 determines that the EMS servers E11 to E14 are STBY EMS servers.

The NMS management unit 611 acquires information about the load on the NMS server N2 from the storage unit 620. The NMS management unit 611 acquires information about the loads on the EMS servers E11 to E14 from storage units in the monitoring servers 700 to 700c, respectively, via the EMS server communication unit 614. The NMS management unit 611 transmits the acquired load information to the migration unit 612.

The migration unit 612 acquires threshold information from the storage unit 620. The migration unit 612 acquires threshold information from storage units in the monitoring servers 700 to 700c, respectively, via the EMS server communication unit 614. The migration unit 612 combines the load information transmitted from the NMS management unit 611. For example, the migration unit 612 combines the load information about the NMS server N2 and that about the EMS servers E11 and E12. The migration unit 612 also combines the load information about the EMS server E13 and that about the EMS server E14. For example, combining the load information means summing up the values representing all the loads.

The migration unit 612 determines whether any of the EMS servers E11 to E14 can be migrated to the management server 600 or any of the monitoring servers 700 to 700c. The EMS servers E11 to E14 are preferentially migrated to the management server 600. By preferentially migrating an EMS server to the management server 600, the power of the corresponding monitoring server is allowed to be reduced by the amount of the migration of the EMS server to the management server 600. In the example in FIG. 15, the power of the monitoring servers 700, 700a, and 700c is turned off. In this way, the power consumption of the sub-center 500 is reduced. No degradation operation is performed on the NMS server N2. If migration of an EMS server to the management server 600 is not possible, the EMS server is migrated to any one of the monitoring servers 700 to 700c. In addition, whether an EMS server can be migrated to the management server 600 or any one of the monitoring servers 700 to 700c is determined on the basis of threshold information stored in a storage unit in the management server 600 or in a corresponding one of the monitoring servers 700 to 700c as migration destination candidates. If the value obtained by combining the load information is above the threshold of a migration destination candidate, the EMS server is not migrated to this apparatus having the threshold information.

This example will be described assuming that the value obtained by combining the load information about the NMS server N2 and the load information about the EMS servers E11 and E12 is not above the threshold indicated by the threshold information stored in the management server 600 and that the value obtained by combining the load information about the EMS servers E13 and E14 is not above the threshold indicated by the threshold information stored in the monitoring server 700b.

The migration unit 612 notifies the monitoring server 700 that the migration unit 612 performs a degradation operation on the EMS server E11 via the EMS server communication unit 614. The migration unit 612 migrates the EMS server E11 to the management server 600. Hereinafter, a migration procedure will be described. The monitoring server 700 duplicates the EMS server E11. The monitoring server 700 halts the operation of the EMS server E11. The monitoring server 700 transmits the duplicate of the EMS server E11 to the management server 600. The migration unit 612 starts the operation of the duplicate copy of the EMS server E11. The migration unit 612 updates network settings of the EMS server E11 so that the EMS server E11 is allowed to perform communication in the management server 600. The monitoring server 700 deletes the EMS server E11.

Likewise, the migration unit 612 migrates the EMS server E12 and the EMS server E14 to the management server 600 and the monitoring server 700b, respectively. The management server 600 provides the EMS server E12 with resource less than that needed for processing its maximum load. For example, the management server 600 provides the EMS server E12 with sufficient resource for processing notification messages transmitted in a normal condition from an NE in the monitoring target area of the EMS server E12. The monitoring server 700b provides the EMS server E14 with resource less than that needed for processing its maximum load. For example, the management server 700 provides the EMS server E14 with sufficient resource for processing notification messages transmitted in a normal condition from an NE in the monitoring target area of the EMS server E14.

The migration unit 612 registers information indicating that the migration destination of the EMS servers E11 and E12 is the management server 600 in the system table 621. In addition, the migration unit 612 registers information indicating that the migration destination of the EMS server E14 is the monitoring server 700b in the system table 621. The migration unit 612 instructs the migration-source monitoring servers to turn off their power. Each of the migration-source monitoring servers 700, 700a, and 700c makes a setting for turning off its own power and turns off its own power.

In this way, in a normal operation, by migrating standby EMS servers to other apparatuses, the power of each of the migration-source monitoring servers is allowed to be turned off. Since the power of each of the migration-source monitoring servers is turned off, the sum of the resource in the management server 600 and the monitoring servers 700 to 700c that belong to the sub-center 500 is reduced. As a result, it is possible to reduce the standby resource and allow each of the EMS servers E11 to E14 to continuously monitor their monitoring target NEs. In addition, since the power of each of the migration-source monitoring servers is turned off, the power consumption of the sub-center 500 is reduced.

Figure 16:
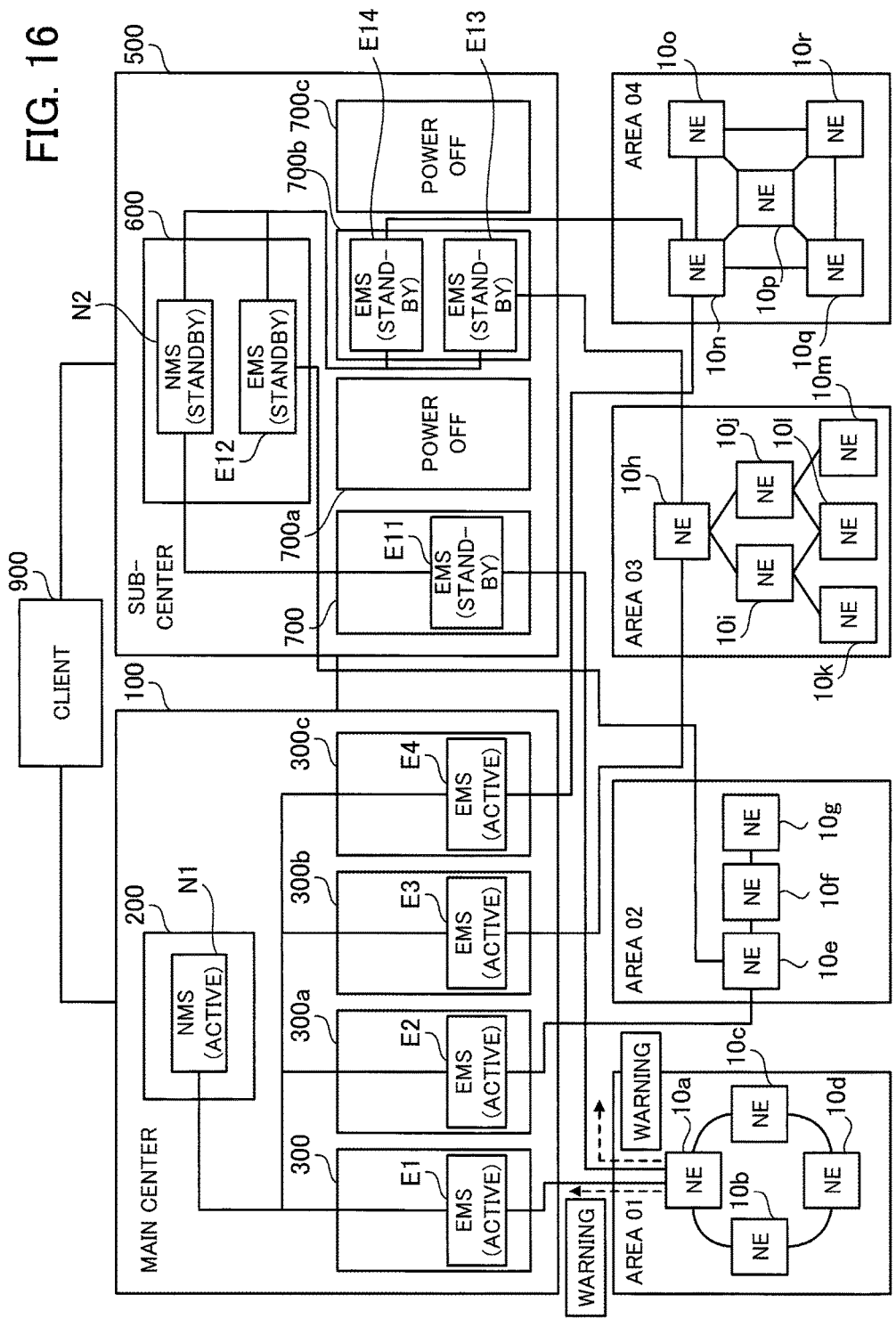

FIG. 16 illustrates a third specific example of processing performed in the network monitoring system. In FIG. 16, a large number of alarms have been issued from the NE 10a, and the degradation operation for causing the EMS server E11 to operate on the management server 600 has been cancelled. As illustrated in FIG. 16, the EMS server E11 has been migrated back to the monitoring server 700. Hereinafter, the cancellation of the degradation operation performed on the EMS server E11 will be described.

The NMS management unit 611 detects that the load on the management server 600 has been increased by a large number of alarms issued by the NE 10a and that the load has exceeded the corresponding threshold. Namely, the NMS management unit 611 detects that the load is above the threshold by referring to the load information and threshold information stored in the storage unit 620.

The NMS management unit 611 determines whether an EMS server that has caused the load to exceed the threshold is operated on the management server 600. The NMS management unit 611 determines that the EMS server E11 is such EMS server. The NMS management unit 611 transmits a request to cancel the degradation operation performed on the EMS server E11 to the migration unit 612. The migration unit 612 turns on the power of the migration-source monitoring server 700. For example, the migration unit 612 may use a wake-on-LAN (WOL) function to turn on the power of the migration-source monitoring server 700. The migration unit 612 migrates the EMS server E11 back to the migration-source monitoring server 700. The migration unit 612 notifies the NMS management unit 611 that the degradation operation on the EMS server E11 has been cancelled. The NMS management unit 611 registers information indicating that the EMS server E11 has been migrated back to the migration source in the system table 621.

In this way, the degradation operation on the EMS server E11 is cancelled so that the EMS server E11 is operated on the monitoring server 700 capable of allocating sufficient resource for processing the large number of alarms transmitted from the NE 10a. Next, the EMS server E11 processes the alarms. Since the EMS server E11 has been migrated back to the monitoring server 700, the load on the management server 600 falls below the threshold.

Figure 17:
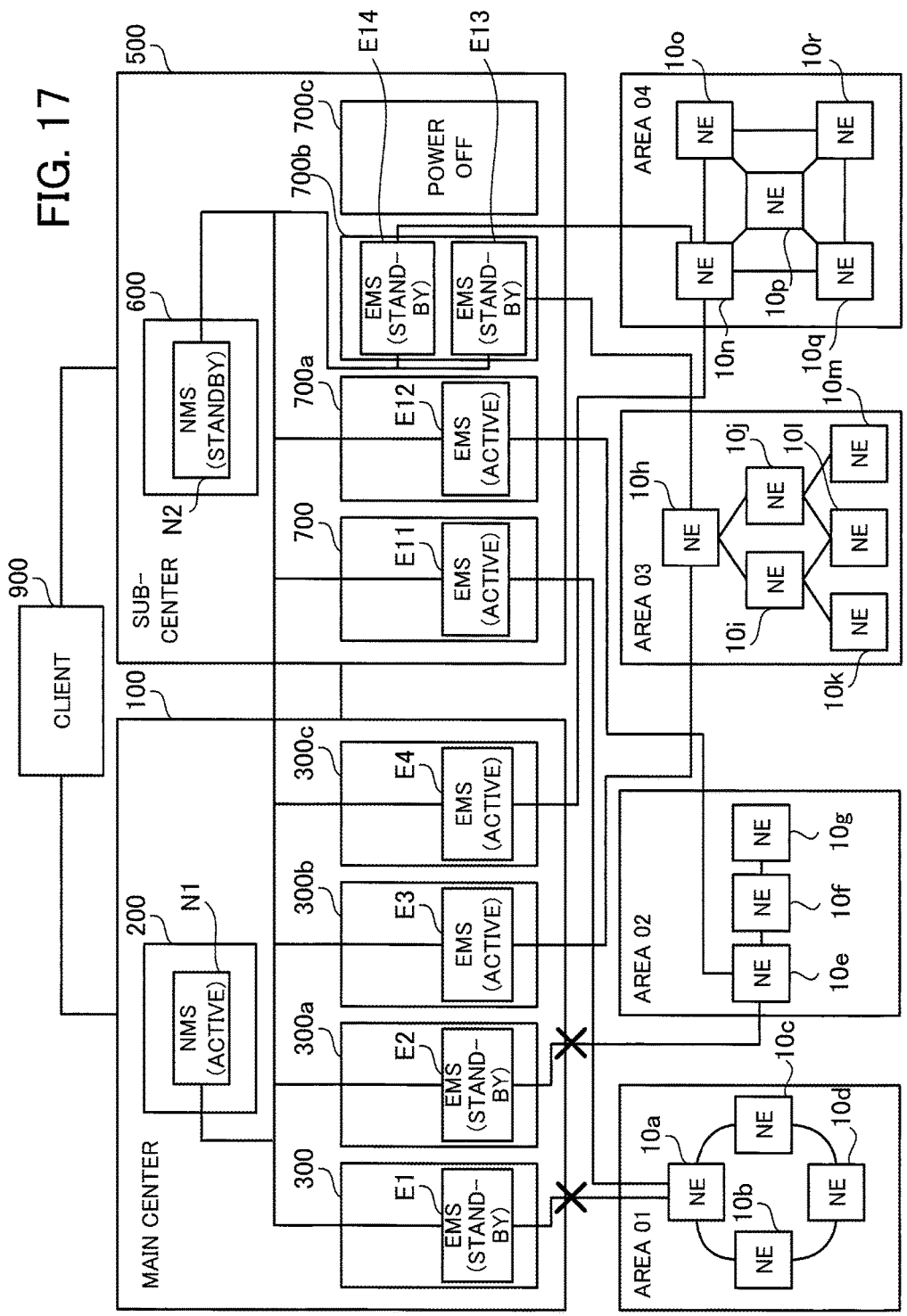

FIG. 17 illustrates a fourth specific example of processing performed in the network monitoring system. In FIG. 17, the degradation operation for causing the EMS server E12 to operate on the management server 600 has been cancelled, and the EMS server E12 has been migrated back to the monitoring server 700a. As illustrated in FIG. 17, the operation status of each of the EMS servers E11 and E12 has been switched from "standby" to "active." In contrast, the operation status of each of the EMS servers E1 and E2 has been switched from "active" to "standby." Hereinafter, system-switching processing will be described.

The EMS server E1 detects that an abnormality has occurred in the monitoring of the NE 10a. The EMS server E2 detects that an abnormality has occurred in the monitoring of the NE 10e. Examples of such an abnormality include: communication failure between the EMS server E1 and the NE 10a; packet loss caused by congestion between the EMS server E1 and the NE 10a; and communication failure between the EMS server E1 and any one of the NEs 10b to 10d via the NE 10a. The EMS servers E1 and E2 notify the NMS management unit 211 that the abnormalities have occurred in the monitoring of the NEs 10a and NE 10e, respectively. The NMS management unit 211 registers time at which the abnormalities have occurred in the NE management table 222. The NMS management unit 211 registers the contents of the abnormalities in the notification table 223.

The NMS management unit 611 acquires communication status information from the storage unit 620. The NMS management unit 611 transmits the communication status information to the main center 100 via the inter-center communication unit 615. The NMS management unit 211 refers to the system table 221, the NE management table 222, and the communication status information. By referring to the NE management table 222, the NMS management unit 211 determines that a predetermined period of time has elapsed since the abnormalities have occurred in the monitoring of the NEs 10a and 10e.

By referring to the communication status information transmitted from the NMS management unit 611 and the communication status information stored in the storage unit 220, the NMS management unit 211 determines which one of the EMS servers E1 and E11 monitoring the NE 10a is in a better communication status. Likewise, by referring to the communication status information transmitted from the NMS management unit 611 and the communication status information stored in the storage unit 220, the NMS management unit 211 determines which one of the EMS servers E2 and E12 monitoring the NE 10e is in a better communication status. Since the abnormalities have been detected between the EMS server E1 and the NE 10a and between the EMS server E2 and the NE 10e, the NMS management unit 211 determines that the EMS servers E11 and E12 are in a better communication status.

By referring to the system table 221, the NMS management unit 211 determines whether a predetermined period of time has elapsed since switchover has occurred on the EMS servers E11 and E12. This example assumes that the predetermined period of time has elapsed since the switchover occurrence time of each of the EMS servers. The NMS management unit 211 notifies the sub-center 500 that the NMS management unit 211 performs a system-switching operation via the inter-center communication unit 215.

By referring to the system table 621, the NMS management unit 611 determines whether the EMS servers E11 and E12 have been migrated. The NMS management unit 611 detects that the EMS server E12 have been migrated. The NMS management unit 611 transmits a request to cancel the degradation operation on the EMS server E12 to the migration unit 612. The migration unit 612 turns on the power of the migration-source monitoring server 700a. The migration unit 612 migrates the EMS server E12 back to the migration-source monitoring server 700a. The migration unit 612 notifies the NMS management unit 611 that the degradation operation on the EMS server E12 has been cancelled. The NMS management unit 612 updates network settings of the EMS servers E11 and E12 so that the EMS servers E11 and E12 are allowed to notify the management server 200 of monitoring information indicating monitored statuses of the NE 10a and 10e, respectively.

The NMS management unit 611 registers information indicating that the EMS servers E11 and E12 have been switched to serve as active systems in the system table 621. More specifically, the NMS management unit 611 registers information indicating that the operation status of each of the EMS servers E11 and E12 has been switched from "STBY" to "ACT" in the system table 621. The NMS management unit 611 registers the switchover occurrence time in the system table 621. The NMS management unit 611 notifies the main center 100 that the system-switching processing has been performed via the inter-center communication unit 615.

The NMS management unit 211 updates network settings of the EMS servers E1 and E2 so that the EMS servers E1 and E2 are allowed to notify the management server 600 of monitoring information indicating monitored statuses of the NE 10a and 10e, respectively.

The NMS management unit 211 registers information indicating that the EMS servers E1 and E2 have been switched to serve as standby systems in the system table 221. The NMS management unit 211 registers the switchover occurrence time in the system table 221.

In this way, even if an abnormality occurs between an EMS server and its monitoring target NE, the monitoring target NE is continuously monitored by switching the corresponding active and standby systems on the basis of their communication statuses. In addition, in the network monitoring system, each of the main center 100 and the sub-center 500 is capable of operating active and standby EMS servers included therein. In addition, by updating network settings of standby EMS servers that belong to the main center 100, the monitoring information indicating statuses monitored by the standby EMS servers is transmitted to the management server 600. Likewise, by updating network settings of active EMS servers that belong to the sub-center 500, the monitoring information indicating statuses monitored by the active EMS servers is transmitted to the management server 200.

In addition, since the system-switching processing is performed on the basis of the abnormality occurrence time, the communication statuses, and the switchover occurrence time, it is possible to prevent frequent execution of the system-switching processing.

Figure 18:
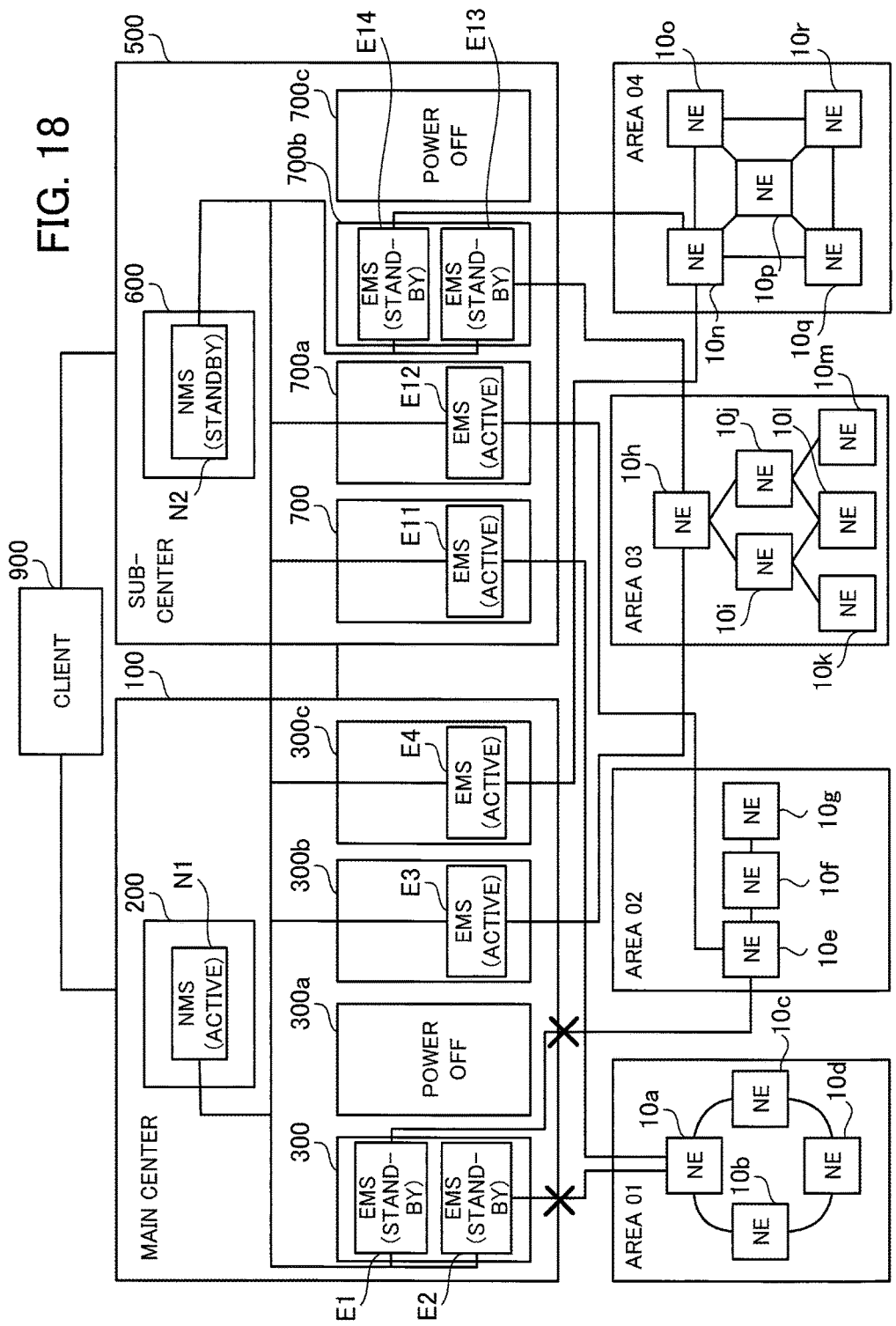

FIG. 18 illustrates a fifth specific example of processing performed in the network monitoring system. In FIG. 18, the EMS server E2 has been migrated to the monitoring server 300. Hereinafter, the degradation operation performed on the EMS server E2 will be described.

The NMS management unit 211 refers to the system table 221 and determines whether any STBY (standby) EMS servers exist. The NMS management unit 211 determines that the EMS servers E1 and E2 are STBY EMS servers.

The NMS management unit 211 acquires load information about the EMS servers E1 and E2 from the storage units included in the monitoring servers 300 and 300a, respectively, via the EMS server communication unit 214. The NMS management unit 211 transmits the acquired load information to the migration unit 212.

The migration unit 212 acquires threshold information from the storage units included in the monitoring servers 300 and 300a, respectively, via the EMS server communication unit 214. The migration unit 212 combines the load information about the EMS servers E1 and E2.

The migration unit 212 determines whether the EMS server E1 or E2 can be migrated to the monitoring server 300 or 300a. The determination is made on the basis of the threshold information stored in the storage units of the monitoring servers 300 and 300a, to which the EMS server E1 or E2 could be migrated. If the value obtained by combining the load information is above the threshold of one of the monitoring servers, the relevant EMS server is not migrated to this monitoring server.

This example assumes that the value obtained by combining the load information about the EMS servers E1 and E2 is not above the threshold of the monitoring server 300. The migration unit 212 migrates the EMS server E2 to the monitoring server 300. The monitoring server 300 provides the EMS server E2 with resource less than that for processing its maximum load.

The migration unit 212 registers information indicating that the migration destination of the EMS server E2 is the monitoring server 300 in the system table 221. The migration unit 212 instructs the migration-source monitoring server to turn off its power. The migration-source monitoring server 300a makes a setting for turning off its own power and turns off its own power.

In this way, by migrating a standby virtual machine that belongs to the main center 100 to another monitoring server in the main center 100, the power of the migration-source monitoring server is allowed to be turned off. Since the power of the migration-source monitoring server is turned off, the sum of the resource in the management server 200 and the monitoring servers 300 to 300c that belong to the main center 100 is reduced. As a result, it is possible to reduce the entire resource and allow each of the EMS servers to continue the monitoring of their monitoring target NEs. In addition, since the power of the migration-source monitoring server is turned off, the power consumption of the main center 100 is reduced.

In a normal operation, an active EMS server is not migrated to an active NMS server or another active EMS server. For example, if an active EMS server is provided with resource less than that for processing its maximum load, when the active EMS server receives the maximum load transmitted from its monitoring target NE, the active EMS server is unable to process its maximum load. Namely, each active EMS server needs to be prepared for processing of its maximum load transmitted from any one of their monitoring target NEs.

The processing performed in the network monitoring system that has thus been described with reference to FIGS. 14 to 18 will be described with reference to flowcharts.

Figure 19:
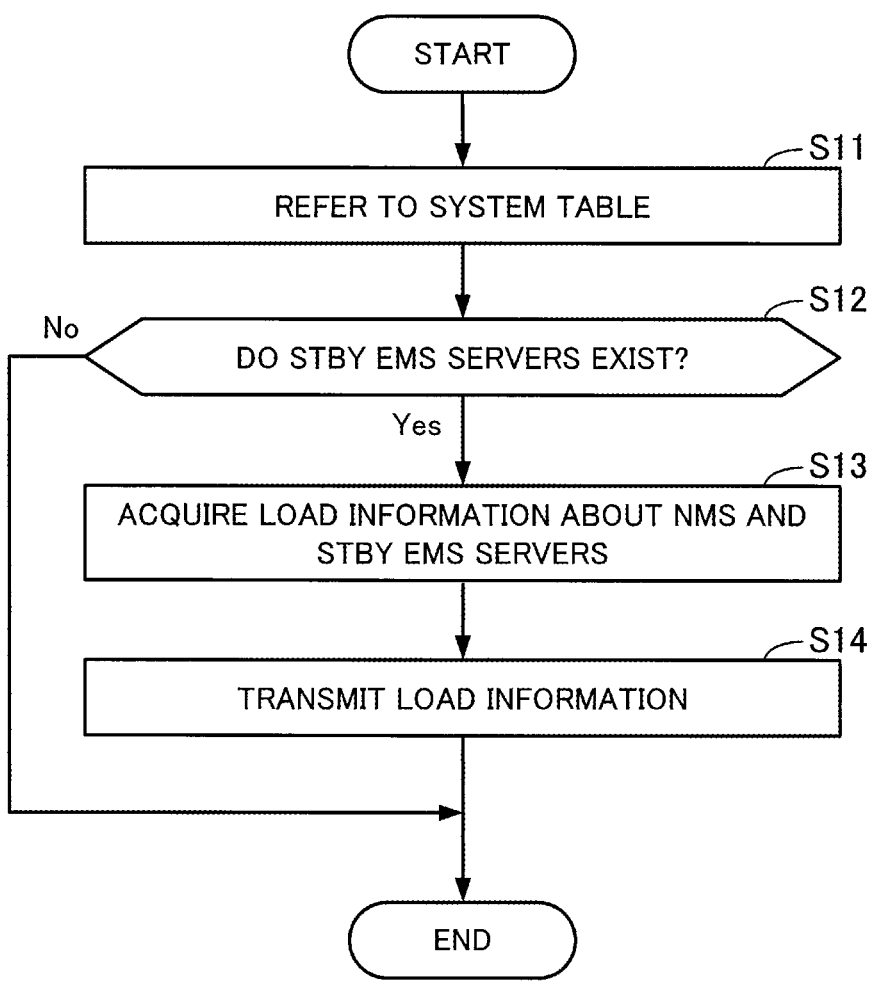
FIG. 19 is a flowchart illustrating exemplary processing for monitoring load on virtual machines.

FIG. 19 is a flowchart illustrating exemplary processing for monitoring load on virtual machines. Hereinafter, the processing illustrated in FIG. 19 will be described step by step. While the following processing will be described by using the NMS management unit 611, the NMS management unit 211 also performs similar processing.

(S11) The NMS management unit 611 refers to the system table 621.

(S12) The NMS management unit 611 determines whether any STBY EMS servers exist. If at least one STBY EMS server exists, the processing proceeds to step S13. Otherwise, the processing proceeds to END.

(S13) The NMS management unit 611 acquires load information about the NMS server 610 from the storage unit 620. The NMS management unit 611 acquires load information about the STBY EMS server via the EMS server communication unit 614.

(S14) The NMS management unit 611 transmits the load information acquired in step S13 to the migration unit 612. Next, the processing proceeds to END.

The NMS management unit 611 periodically performs the processing of steps S11 to S14. In step S12, the NMS management unit 211 determines whether at least two STBY EMS servers exist. In step S13, the NMS management unit 211 does not perform processing for acquiring load information about the NMS server 210 from the storage unit 220.

Figure 20:
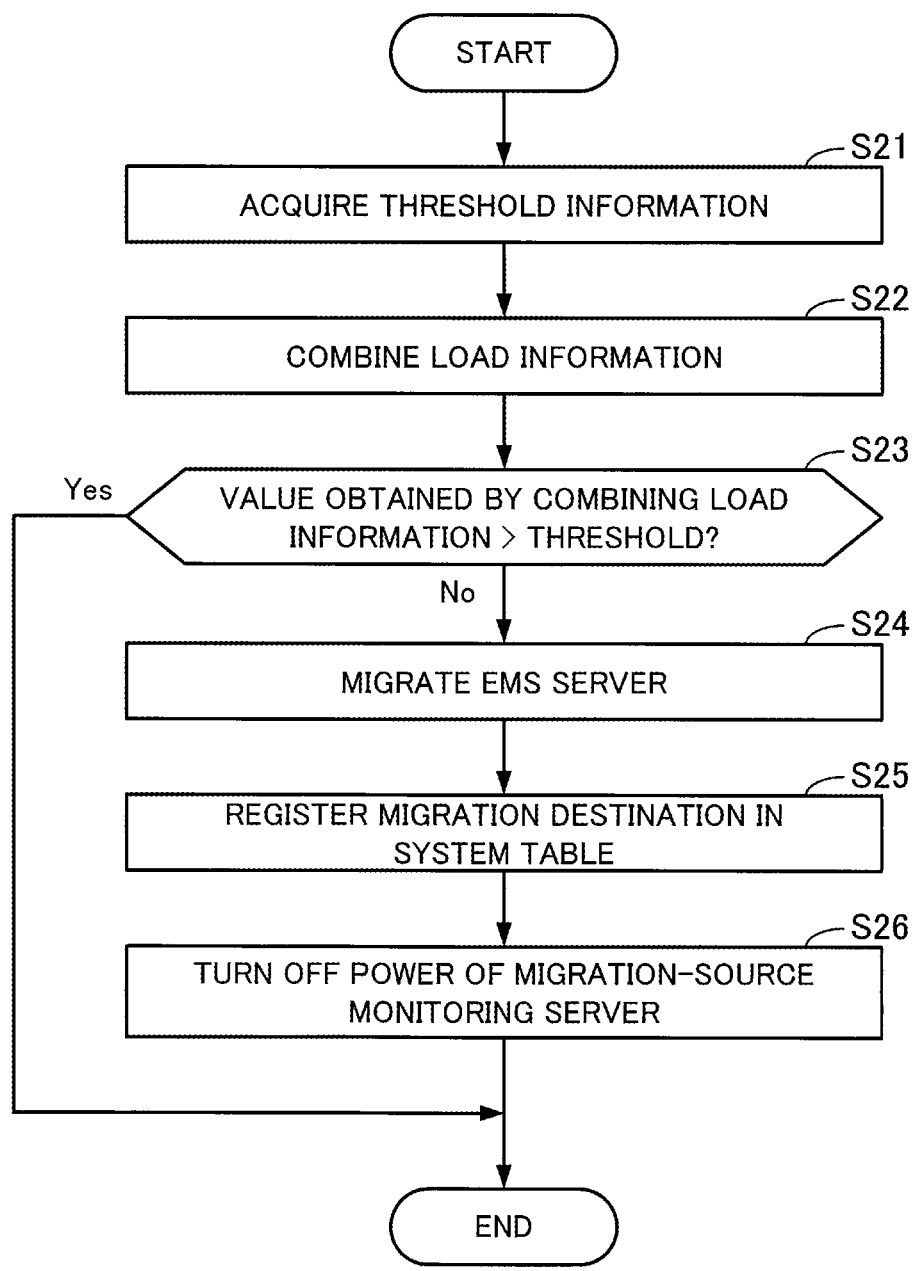
FIG. 20 is a flowchart illustrating exemplary processing for performing a degradation operation on a virtual machine.

FIG. 20 is a flowchart illustrating exemplary processing for performing a degradation operation on a virtual machine. Hereinafter, the processing illustrated in FIG. 20 will be described step by step. While the following processing will be described by using the migration unit 612, the migration unit 212 also performs similar processing.

(S21) The migration unit 612 acquires threshold information from the storage unit 620. The migration unit 612 acquires threshold information from the storage unit of the monitoring server that operates the above STBY EMS server via the EMS server communication unit 614.

(S22) The migration unit 612 combines the load information transmitted in step S14. For example, the migration unit 612 combines the load information about the NMS server 610 and the load information about the STBY EMS server. Alternatively, the migration unit 612 combines the load information about a plurality of STBY EMS servers.

(S23) The migration unit 612 determines whether the value obtained by combining the load information is above the threshold. If the value is above the threshold, the processing proceeds to END. Otherwise, the processing proceeds to step S24. In addition, the migration unit 612 preferentially migrates the STBY EMS server to the management server 600. If the STBY EMS server is not migrated to the management server 600, the migration unit 612 migrates the STBY EMS server to another monitoring server. Namely, the STBY EMS server is operated in a monitoring server operating at least one STBY EMS server.

(S24) The migration unit 612 migrates the STBY EMS server to the management server 600 or a monitoring server operating at least one STBY EMS server.

(S25) The migration unit 612 registers the migration destination of the STBY EMS server in the system table 621.

(S26) If no other virtual machine is operated in the migration-source monitoring server, the migration unit 612 instructs the migration-source monitoring server to turn off its power. The migration-source monitoring server makes a setting for turning off its own power and turns off its own power. Next, the processing proceeds to END.

In step S23, the migration unit 212 does not perform processing for preferentially migrating a STBY EMS server to the NMS server 210. In step S24, the migration unit 212 does not migrate a STBY EMS server to the management server 200.

Figure 21:
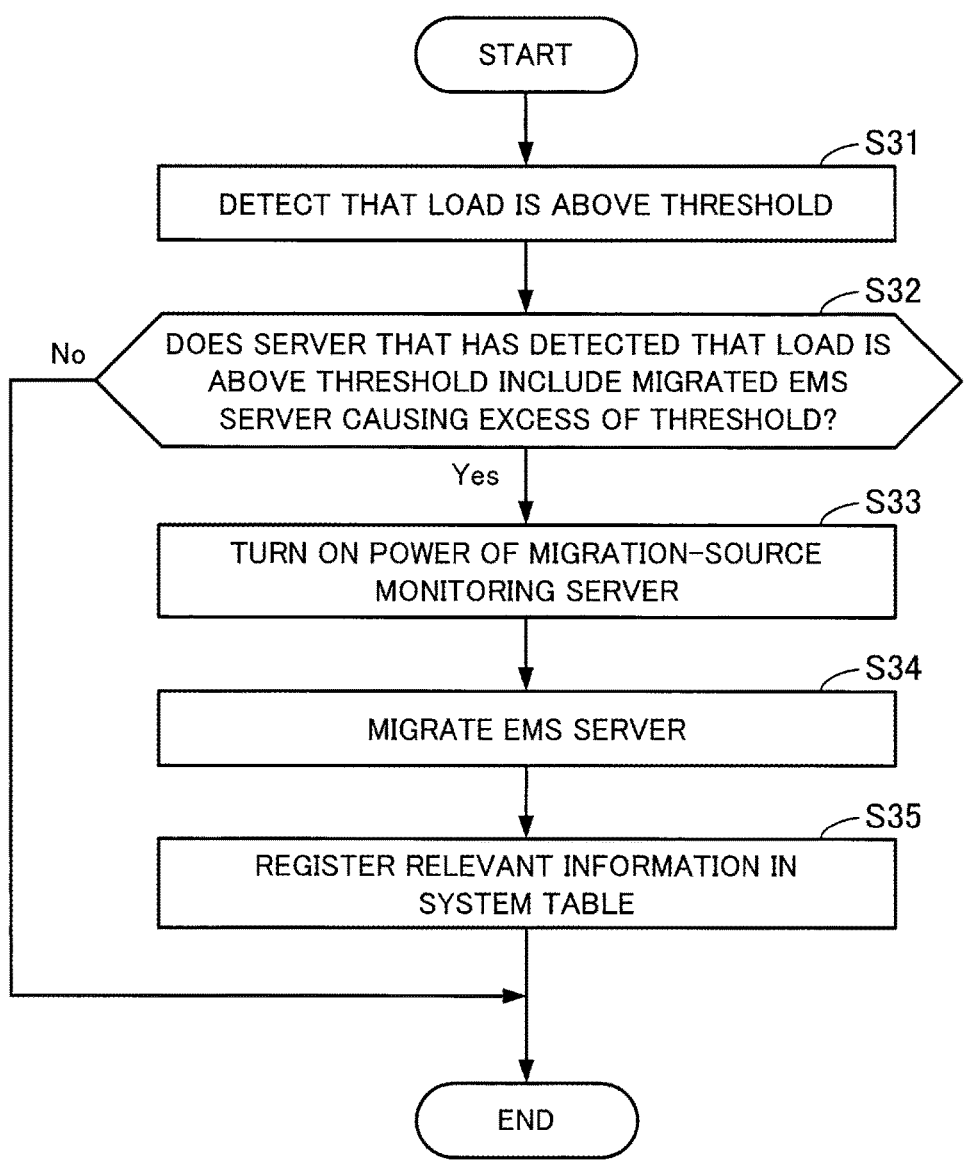
FIG. 21 is a flowchart illustrating exemplary processing for cancelling the degradation operation performed on the virtual machine.

FIG. 21 is a flowchart illustrating exemplary processing for cancelling the degradation operation performed on the virtual machine. Hereinafter, the processing illustrated in FIG. 21 will be described step by step. While the following processing will be described by using the NMS management unit 611 and the migration unit 612, the NMS management unit 211 and the migration unit 212 also perform similar processing.

(S31) By referring to the load information and threshold information stored in the storage unit 620, the NMS management unit 611 detects that the load is above the threshold. For example, the NMS management unit 611 detects that a concentration of accesses from the client 900 has caused the load to exceed the threshold. Alternatively, the NMS management unit 611 detects that the load on an EMS server managed by the NMS server 610 has exceeded the threshold by receiving a message from the EMS server.

(S32) By referring to the system table 621, the NMS management unit 611 determines whether the server that has detected that the load is above the threshold includes the migrated EMS server causing the excess of the threshold. If so, the NMS management unit 611 instructs the migration unit 612 to cancel the degradation operation performed on the degraded EMS server. Namely, the processing proceeds to step S33. If not, the processing proceeds to END. The server detecting that the load is above the threshold may be the management server 600 or the monitoring server that operates the EMS server being managed by the NMS server 610.

(S33) The migration unit 612 turns on the power of the migration-source monitoring server.

(S34) The migration unit 612 migrates the migrated EMS server back to the migration-source monitoring server. The migration unit 612 notifies the NMS management unit 611 that the degradation operation on the migrated EMS server has been cancelled.

(S35) The NMS management unit 611 registers information indicating that the migrated EMS server has been migrated back to the migration source in the system table 621. Next, the processing proceeds to END.

Figure 22:
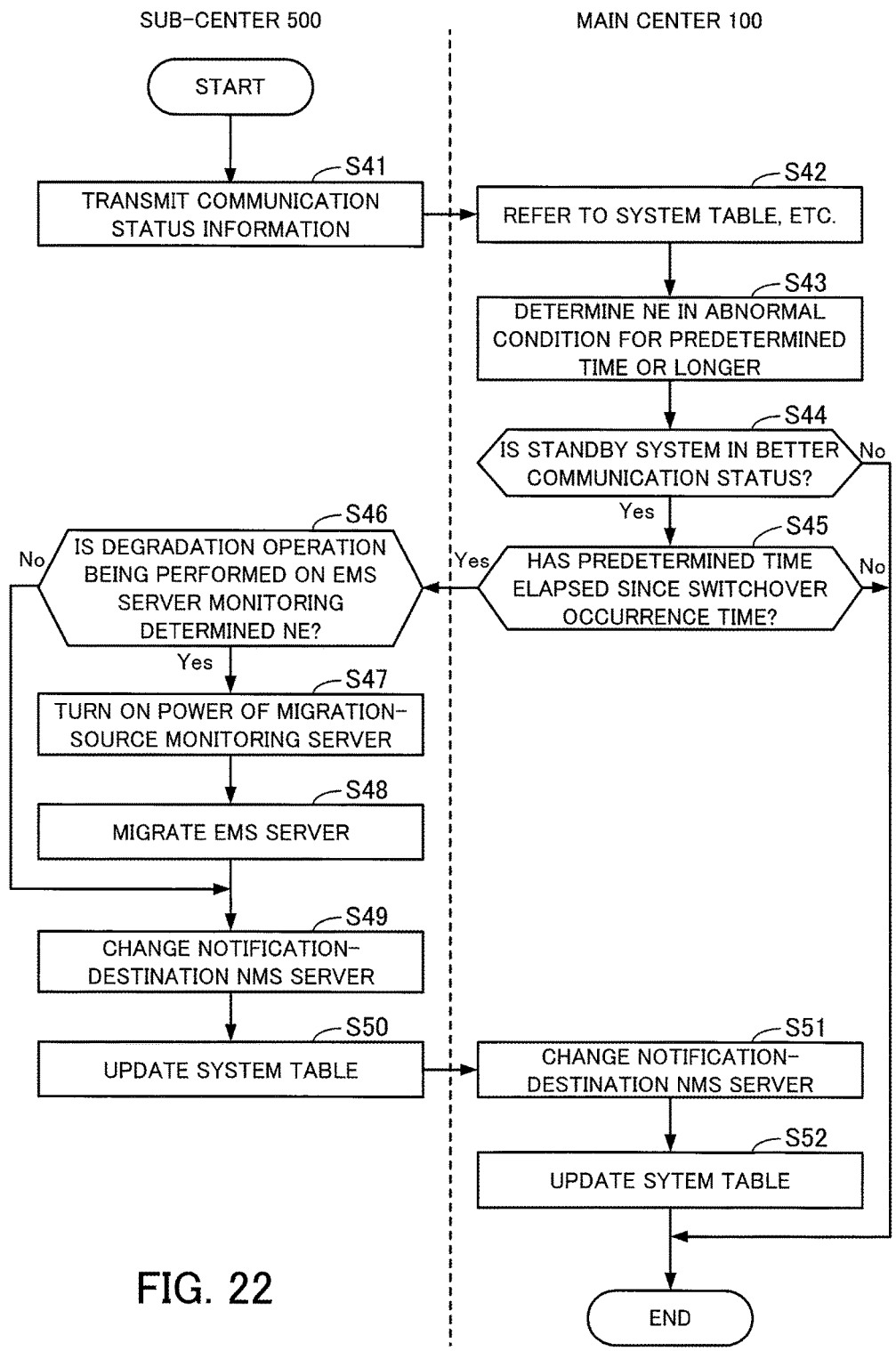
FIG. 22 is a flowchart illustrating exemplary system-switching processing.

FIG. 22 is a flowchart illustrating exemplary system-switching processing. Hereinafter, the processing illustrated in FIG. 22 will be described step by step. In addition, the processing illustrated in FIG. 22 will be described assuming that an abnormality has occurred in communication between an active EMS server and an NE monitored by the active EMS server.

(S41) The NMS management unit 611 acquires communication status information from the storage unit 620. The NMS management unit 611 transmits the communication status information to the main center 100 via the inter-center communication unit 615. The NMS management unit 611 periodically performs the processing in step S41.

(S42) The NMS management unit 211 refers to the system table 221, the NE management table 222, and the communication status information stored in the storage unit 220.

(S43) The NMS management unit 211 determines an NE that has been in an abnormal condition for at least a predetermined period of time.

(S44) The NMS management unit 211 refers to the communication status information transmitted in step S41 and the communication status information stored in the storage unit 220 and determines which one of the active and standby EMS servers that monitor the NE determined in step S43 is in a better communication status. If the communication status of the standby EMS server is better, the NMS management unit 211 selects the standby EMS server, and the processing proceeds to step S45. If the communication status of the standby EMS server is not better, the processing proceeds to END.

(S45) The NMS management unit 211 determines whether a predetermined period of time has elapsed since the corresponding switchover occurrence time. If the predetermined period of time has elapsed, the NMS management unit 211 notifies the management server 600 that the NMS management unit 211 performs system-switching processing via the inter-center communication unit 215, and the processing proceeds to step S46. If the predetermined period of time has not elapsed, the processing proceeds to END.

(S46) The NMS management unit 611 refers to the system table 621 and determines whether a degradation operation is being performed on the EMS server determined in step S44. If so, the NMS management unit 611 transmits a request to the migration unit 612 to cancel the degradation operation, and the processing proceeds to S47. If a degradation operation is not being performed on the EMS server, the processing proceeds to step S49.

(S47) The migration unit 612 turns on the power of the migration-source monitoring server.

(S48) The migration unit 612 migrates the EMS server back to the migration-source monitoring server. The migration unit 612 notifies the NMS management unit 611 that the degradation operation on the EMS server has been cancelled.

(S49) The NMS management unit 611 updates the relevant network settings so that the EMS server determined in step S44 is allowed to transmit monitoring information indicating a monitored status of the NE to the management server 200.

(S50) The NMS management unit 611 registers information indicating that the systems have been switched in the system table 621. In addition, the NMS management unit 611 registers the switchover occurrence time in the system table 621. The NMS management unit 611 notifies the management server 200 that the system-switching processing has been performed via the inter-center communication unit 615.

(S51) The NMS management unit 211 updates the relevant network settings so that the EMS server that monitors the same NE monitored by the EMS server determined in step S44 is allowed to transmit monitoring information indicating a monitored status of the NE to the management server 600.

(S52) The NMS management unit 211 registers information indicating that the systems have been switched in the system table 221. In addition, the NMS management unit 211 registers the switchover occurrence time in the system table 221, and the processing proceeds to END.

Alternatively, the sub-center 500 may perform the processing performed in the main center 100, and the main center 100 may perform the processing performed in the sub-center 500.

The following description will be made with reference to FIGS. 14 to 18. According to the second embodiment, in a normal operation, the EMS server E12 is operated on the management server 600, and the power of the monitoring server 700a is turned off. As a result, since the sum of the resource in the management server 600 and the monitoring servers 700 to 700c that belong to the standby sub-center 500 is reduced, the power consumption of the standby sub-center 500 is reduced.

If an abnormality occurs in the monitoring of the NE 10e by the EMS server E2, the management server 600 migrates the EMS server E12 to the monitoring server 700a capable of providing the EMS server E12 with sufficient resource for processing its maximum load. In this way, the EMS server E12 continuously monitors the NE 10e. In addition, since the EMS server E12 is capable of processing the maximum load received from the NE 10e, the reliability provided by the network monitoring system having a hot-standby redundancy configuration is maintained. Namely, according to the second embodiment, it is possible to maintain the reliability of the network monitoring system while keeping the standby resource in a normal operation at a low level.

In addition, a plurality of embodiments may be combined to such an extent that does not cause inconsistency.

The reliability of a conventional system having a redundancy configuration could be decreased by reducing the amount of resource in its standby system. However, such decrease is prevented in one aspect of the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A network monitoring system that includes a plurality of information processing apparatuses, the network monitoring system comprising:
    a first information processing apparatus configured to provide a first resource to a first virtual machine monitoring a monitoring target apparatus and operate the first virtual machine as an active virtual machine, the first resource being sufficient to process, by the first virtual machine, a maximum possible load received from the monitoring target apparatus;
    a second information processing apparatus configured to provide a second resource to a second virtual machine monitoring the monitoring target apparatus and operate the second virtual machine as a stand-by virtual machine, the second resource being not sufficient to process, by the second virtual machine, the maximum possible load, the second virtual machine as the stand-by virtual machine receiving, from the monitoring target apparatus, a load which is equal to a load that the first virtual machine as the active virtual machine receives from the monitoring target apparatus;
    a third information processing apparatus configured to be capable of providing the second virtual machine with a third resource which is sufficient to process, by the second virtual machine, the maximum possible load, a power of the third information processing apparatus being off before an abnormality of the active virtual machine occurs in the monitoring of the monitoring target apparatus by the first virtual machine; and
    a notification apparatus that acquires information indicating a first communication status between the first virtual machine and the monitoring target apparatus, as well as information indicating a second communication status between the second virtual machine and the monitoring target apparatus, and when the second communication status is better than the first communication status, notifies the second information processing apparatus that the abnormality of the active virtual machine has occurred and turns on the power of the third information processing apparatus,
    wherein, upon notification of the abnormality of the active virtual machine from the notification apparatus, the second information processing apparatus migrates the second virtual machine as the stand-by virtual machine to the third information processing apparatus, and the third information processing apparatus provides the second virtual machine with the third resource and operates the second virtual machine as the active virtual machine.

2. The network monitoring system according to claim 1, further comprising:
    a fourth information processing apparatus configured to manage at least one active virtual machine; and
    a fifth information processing apparatus configured to manage at least one standby virtual machine,
    wherein, before the second virtual machine is migrated, the first information processing apparatus uses the first virtual machine as an active virtual machine and transmits first monitoring information indicating a monitored status of the monitoring target apparatus monitored by the first virtual machine to the fourth information apparatus,
    wherein, after the second virtual machine is migrated, the first information processing apparatus uses the first virtual machine as a standby virtual machine and transmits the first monitoring information to the fifth information processing apparatus,
    wherein, before the second virtual machine is migrated, the second information processing apparatus uses the second virtual machine as a standby virtual machine and transmits second monitoring information indicating a monitored status of the monitoring target apparatus monitored by the second virtual machine to the fifth information processing apparatus, and
    wherein, after the second virtual machine is migrated, the third information processing apparatus uses the second virtual machine as an active virtual machine and transmits the second monitoring information to the fourth information processing apparatus.

3. The network monitoring system according to claim 2, wherein the fourth information processing apparatus or the fifth information processing apparatus serves as the notification apparatus.

4. The network monitoring system according to claim 1, wherein, after the second virtual machine is migrated to the third information processing apparatus, the first information processing apparatus migrates the first virtual machine to a sixth information processing apparatus providing a third virtual machine monitoring a monitoring target apparatus different from the monitoring target apparatus with resource.

5. A network monitoring method performed by a system that includes a plurality of information processing apparatuses, the network monitoring method comprising:
- providing, by a first information processing apparatus, a first resource to a first virtual machine monitoring a monitoring target apparatus and operating the first virtual machine as an active virtual machine, the first resource being sufficient to process, by the first virtual machine, a maximum possible load received from the monitoring target apparatus;
- providing, by a second information processing apparatus, a second resource to a second virtual machine monitoring the monitoring target apparatus and operating the second virtual machine as a stand-by virtual machine, the second resource being not sufficient to process, by the second virtual machine, the maximum possible load, the second virtual machine as the stand-by virtual machine receiving, from the monitoring target apparatus, a load which is equal to a load that the first virtual machine as the active virtual machine receives from the monitoring target apparatus;
- acquiring, by a notification apparatus, information indicating a first communication status between the first virtual machine and the monitoring target apparatus, as well as information indicating a second communication status between the second virtual machine and the monitoring target apparatus;
- notifying, by the notification apparatus, the second information processing apparatus that an abnormality of the active virtual machine has occurred in the monitoring of the monitoring target apparatus by the first virtual machine and turning on a power of a third information processing apparatus which is capable of providing the second virtual machine with a third resource which is sufficient to process, by the second virtual machine, the maximum possible load, when the second communication status is better than the first communication status, the power of the third information processing apparatus being off before the abnormality of the active virtual machine occurs;
- migrating, by the second information processing apparatus, upon notification of the abnormality of the active virtual machine from the notification apparatus, the second virtual machine as the stand-by virtual machine to the third information processing apparatus; and
- providing, by the third information processing apparatus, the second virtual machine with the third resource and operating the second virtual machine as the active virtual machine.

6. A network monitoring system that includes a plurality of information processing apparatuses, the network monitoring system comprising:
- a first information processing apparatus configured to provide a first resource to a first virtual machine monitoring a first monitoring target apparatus and operate the first virtual machine as an active virtual machine, the first resource being sufficient to process, by the first virtual machine, a maximum possible load received from the first monitoring target apparatus;
- a second information processing apparatus capable of providing a second virtual machine monitoring the first monitoring target apparatus with a second resource which is smaller than the first resource, the second information processing apparatus being configured to provide a fourth resource to a fourth virtual machine monitoring a second monitoring target apparatus, to provide the second virtual machine with the second resource, and to operate the second virtual machine as a stand-by virtual machine, the second resource being not sufficient to process, by the second virtual machine, the maximum possible load, the second virtual machine as the stand-by virtual machine receiving, from the first monitoring target apparatus, a load which is equal to a load that the first virtual machine as the active virtual machine receives from the first monitoring target apparatus; and
- a notification apparatus that acquires information indicating a first communication status between the first virtual machine and the first monitoring target apparatus, as well as information indicating a second communication status between the second virtual machine and the first monitoring target apparatus, and when the second communication status is better than the first communication status, notifies the second information processing apparatus that an abnormality of the active virtual machine has occurred in the monitoring of the first monitoring target apparatus by the first virtual machine,
- wherein, upon notification of the abnormality of the active virtual machine from the notification apparatus, the second information processing apparatus migrates the second virtual machine as the stand-by virtual machine to a third information processing apparatus configured to be capable of providing the second virtual machine with a third resource for processing the maximum possible load.

* * * * *